US010469814B2

(12) United States Patent
Kaji et al.

(10) Patent No.: US 10,469,814 B2
(45) Date of Patent: Nov. 5, 2019

(54) IMAGE PROCESSING APPARATUS AND METHOD

(71) Applicant: SONY CORPORATION, Tokyo (JP)

(72) Inventors: Yohsuke Kaji, Chiba (JP); Yugo Katsuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,324

(22) PCT Filed: Feb. 27, 2017

(86) PCT No.: PCT/JP2017/007320
§ 371 (c)(1),
(2) Date: Jul. 16, 2018

(87) PCT Pub. No.: WO2017/154628
PCT Pub. Date: Sep. 14, 2017

(65) Prior Publication Data
US 2019/0028685 A1 Jan. 24, 2019

(30) Foreign Application Priority Data
Mar. 11, 2016 (JP) ................................ 2016-048241

(51) Int. Cl.
*H04N 9/31* (2006.01)
*H04N 5/74* (2006.01)
(Continued)

(52) U.S. Cl.
CPC ............. *H04N 9/3185* (2013.01); *G06T 7/60* (2013.01); *G06T 7/74* (2017.01); *H04N 5/74* (2013.01);
(Continued)

(58) Field of Classification Search
CPC ...... H04N 5/74; H04N 9/3147; H04N 9/3194; H04N 9/3185; G06T 7/74; G06T 7/60
(Continued)

(56) References Cited

U.S. PATENT DOCUMENTS 6,064,423 A * 5/2000 Geng ................ G02B 27/2292 348/36
6,100,862 A * 8/2000 Sullivan ................. G06T 15/00 345/88
(Continued)

FOREIGN PATENT DOCUMENTS

JP 2005-110252 A 4/2005
JP 2015-158658 A 9/2015
WO WO 2014/103157 A1 7/2014

OTHER PUBLICATIONS

Raskar et al., The Office of the Future: A Unified Approach to Image-Based Modeling and Spatially Immersive Displays, SIGGRAPH 98, Computer Graphics Proceedings, Annual Conference Series, 1998, Jul. 19-24, 1998, pp. 1-10, Orlando, Florida.
(Continued)

*Primary Examiner* — Jefferey F Harold
*Assistant Examiner* — Mustafizur Rahman
(74) *Attorney, Agent, or Firm* — Paratus Law Group, PLLC

(57) ABSTRACT

There is provided an image processing apparatus and method that realize corresponding point detection during content viewing while keeping cost increase to a minimum. A pattern image including a given pattern is superimposed on any one of a plurality of subframes corresponding to a frame, each subframe is sequentially projected onto a projection section, a capture section is caused to capture the projected subframe image, projected by the projection section, on which the pattern image has been superimposed in synchronism with the projection control, and corresponding
(Continued)

points between the projected image and a captured image are detected on the basis of the pattern image included in the captured image acquired as a result of capture by the capture section, in accordance with the capture control. The present disclosure is applicable, for example, to an image processing apparatus, projection apparatus, capture apparatus, projection/capture apparatus, control apparatus, projection/capture system, and so on.

22 Claims, 24 Drawing Sheets

(51) Int. Cl.
*G06T 7/73* (2017.01)
*G06T 7/60* (2017.01)

(52) U.S. Cl.
CPC ......... *H04N 9/3147* (2013.01); *H04N 9/3194* (2013.01)

(58) Field of Classification Search
USPC ....... 348/745, 744, 719, 721, 724, 739, 742, 348/743, 750, 761, 762, 791, 222.1, 348/222.11, 208.14, 36, 37, 42, 38, 49, 348/50; 345/419, 424, 427, 633; 353/5, 353/7, 14, 30, 84; 382/195, 201, 293
See application file for complete search history.

(56) References Cited

U.S. PATENT DOCUMENTS 6,765,566 B1 * 7/2004 Tsao ..................... H04N 13/398 345/419
7,760,242 B2 * 7/2010 Anabuki ............... G06F 3/0325 348/208.14
9,292,959 B2 * 3/2016 Ge .......................... G06T 15/00
2003/0090597 A1 * 5/2003 Katoh .................. H04N 9/3111 348/744
2004/0257540 A1 12/2004 Roy et al.
2005/0157272 A1 * 7/2005 Childers ................ G09G 3/007 353/84
2006/0071945 A1 * 4/2006 Anabuki ............... G06F 3/0325 345/633
2009/0073393 A1 * 3/2009 Lee ........................ G03B 21/00 353/94
2010/0053364 A1 * 3/2010 Mino ................. H04N 5/23212 348/222.1
2010/0208148 A1 * 8/2010 Deppe .................. H04N 9/3129 348/744
2013/0201287 A1 * 8/2013 Chida ................ G01B 11/2513 348/46
2013/0229396 A1 9/2013 Huebner
2014/0184914 A1 7/2014 Oshima et al.
2015/0029465 A1 * 1/2015 Ishikawa ................. G06T 3/005 353/30
2015/0219983 A1 * 8/2015 Mashitani ............ G03B 21/142 353/31
2015/0237318 A1 * 8/2015 Nakashin ............. H04N 9/3188 348/745
2015/0244998 A1 * 8/2015 Yanazume ........... H04N 9/3185 348/38
2016/0037147 A1 * 2/2016 Kempf ................. H04N 9/3188 348/744
2018/0061371 A1 * 3/2018 Uema .................... G03B 21/14
2018/0227536 A1 * 8/2018 Takahashi .............. G03B 21/14

OTHER PUBLICATIONS

Feb. 26, 2019, European Search Report issued for related EP Application No. 17762968.0.

* cited by examiner

IMAGE PROCESSING APPARATUS AND METHOD

CROSS REFERENCE TO PRIOR APPLICATION

This application is a National Stage Patent Application of PCT International Patent Application No. PCT/JP2017/007320 (filed on Feb. 27, 2017) under 35 U.S.C. § 371, which claims priority to Japanese Patent Application No. 2016-048241 (filed on Mar. 11, 2016), which are all hereby incorporated by reference in their entirety.

TECHNICAL FIELD

The present disclosure relates to an image processing apparatus and method and particularly to an image processing apparatus and method that realize corresponding point detection during content viewing while at the same time keeping cost increase to a minimum.

BACKGROUND ART

A geometric correction method, conducted by capturing an image projected by a projector with a camera and using the captured image, has been available to correct a projected image to match the projector position and attitude, a projection plane shape, and so on to reduce distortion of the projected image and achieve alignment between images projected by the plurality of projectors. Such a method required finding corresponding points between the projected and captured images.

As a method of finding corresponding points, ISL (Imperceptible Structured Light) was proposed that conducts sensing during content viewing (refer, for example, to NPL 1).

CITATION LIST

Non Patent Literature

[NPL 1]
Imperceptible Structured Light Ramesh Raskar, SIGGRAPH 98

SUMMARY

Technical Problem

However, doubling the frame rate is necessary to realize corresponding point detection using an ISL scheme with an ordinary projector device. This necessitates a dedicated device, possibly resulting in increased development and manufacturing costs.

The present disclosure has been devised in light of such circumstances, and it is an object of the present disclosure to realize corresponding point detection during content viewing while at the same time keeping cost increase to a minimum.

Solution to Problem

An image processing apparatus of an aspect of the present technology includes a projection control section, a capture control section, and a corresponding point detection section. The projection control section superimposes a pattern image including a given pattern on any one of a plurality of subframe images corresponding to a frame and sequentially projects each subframe image onto a projection section. The capture control section causes a capture section to capture the projected subframe image on which the pattern image has been superimposed in synchronism with the projection control performed by the projection control section. The corresponding point detection section detects corresponding points between the projected and captured images on the basis of the pattern image included in a captured image acquired as a result of capture by the capture section under control of the capture control section.

Each of the plurality of subframe images corresponding to the frame can be an image having a given color component of the frame image, and sequential projection of the plurality of subframe images can be rendered equivalent to projection of the frame image.

The projection control section can superimpose the pattern image on a subframe image having a highly luminous color component.

The projection control section can superimpose the pattern image on a green component subframe image.

The plurality of subframes can be eight subframes that include two red component subframes, two blue component subframes, and four green component subframes.

The projection control section can superimpose a pair of pattern images whose directions of luminance change in the pattern are opposite on different subframe images of the plurality of subframes and cause the subframe images to be projected. The capture control section can cause projected subframe images, on which each of the pair of pattern images has been superimposed, to be captured.

Each of the plurality of subframe images corresponding to the frame is an image having a given color component of the frame image, and sequential projection of the plurality of subframe images is rendered equivalent to projection of the frame image, and the projection control section can be configured to superimpose the pair of pattern images on different subframe images having the same color component of the plurality of subframes and cause the subframe images to be projected.

The projection control section can transform the frame into the plurality of subframes, can superimpose the pair of pattern images on the different subframe images having the same color component of the plurality of acquired subframes, and can cause the subframe images to be projected.

The projection control section can transform the frame into the plurality of subframes arranged in such a projection order that the subframe images projected immediately before the respective subframes on which the pair of pattern images are superimposed have the same color component.

The projection control section can transform the frame into the plurality of subframes arranged in a projection order different from the projection order of subframes corresponding to the frame on which no pattern image is superimposed.

The projection control section can perform geometric corrections on each subframe image using parameters specified on the basis of corresponding points detected by the corresponding point detection section and cause the geometrically corrected images to be sequentially projected onto the projection section.

The capture control section can extract the pattern image included in a captured image of the projected subframe image acquired as a result of capture by the capture section.

The capture control section can generate a differential image between the captured images, each including one of a pair of pattern images whose directions of luminance change in the pattern are opposite, and extract the pattern image included in the differential image.

The capture control section can binarize the differential image and extract the pattern image included in the acquired binarized image.

The projection control section can project subframe images, on which the pattern image has been superimposed, onto a plurality of projection sections, and the capture control section can cause a plurality of capture sections to capture projected subframe images, projected by the respective projection sections, on which the pattern image has been superimposed, and the corresponding point detection section can find corresponding points between projected images projected by the respective projection sections and the captured images captured by the respective capture sections.

The image processing apparatus can further include an attitude estimation section that estimates an attitude using the corresponding points detected by the corresponding point detection section.

The image processing apparatus can further include a setup section that performs setups regarding geometric corrections of projected images on the basis of the attitude estimated by the attitude estimation section.

The image processing apparatus can further include a projection section that projects a projected image.

The image processing apparatus can further include a capture section that captures a projected image and acquires a captured image.

An image processing method of an aspect of the present technology superimposes a pattern image including a given pattern on any one of a plurality of subframes corresponding to a frame, sequentially projects each subframe onto a projection section, causes a capture section to capture the projected subframe image, projected by the respective projection sections, on which the pattern image has been superimposed in synchronism with the projection control, and detects corresponding points between the projected and captured images in accordance with the capture control on the basis of the pattern image included in a captured image acquired as a result of capture by the capture section.

In the image processing apparatus and method of an aspect of the present technology, a pattern image including a given pattern is superimposed on any one of a plurality of subframes corresponding to a frame, each subframe is sequentially projected onto a projection section, the projected subframe image on which the pattern image has been superimposed is captured by a capture section, and corresponding points between the projected and captured images are detected on the basis of the pattern image included in a captured image acquired as a result of capture by the capture section.

Advantageous Effects of Invention

According to the present disclosure, it is possible to process an image. In particular, it is possible to realize corresponding point detection during content viewing while at the same time keeping cost increase to a minimum.

DESCRIPTION OF EMBODIMENTS

A description will be given below of modes for carrying out the present disclosure (hereinafter referred to as embodiments). It should be noted that the description will be given in the following order:

1. Corresponding Point Detection and Geometric Corrections
2. First Embodiment (projection/capture system)
3. Second Embodiment (operation mode)
4. Third Embodiment (projection/capture system and projection/capture apparatus)
5. Others

1. Corresponding Point Detection and Geometric Corrections

<Geometric Corrections>

Figure 1:
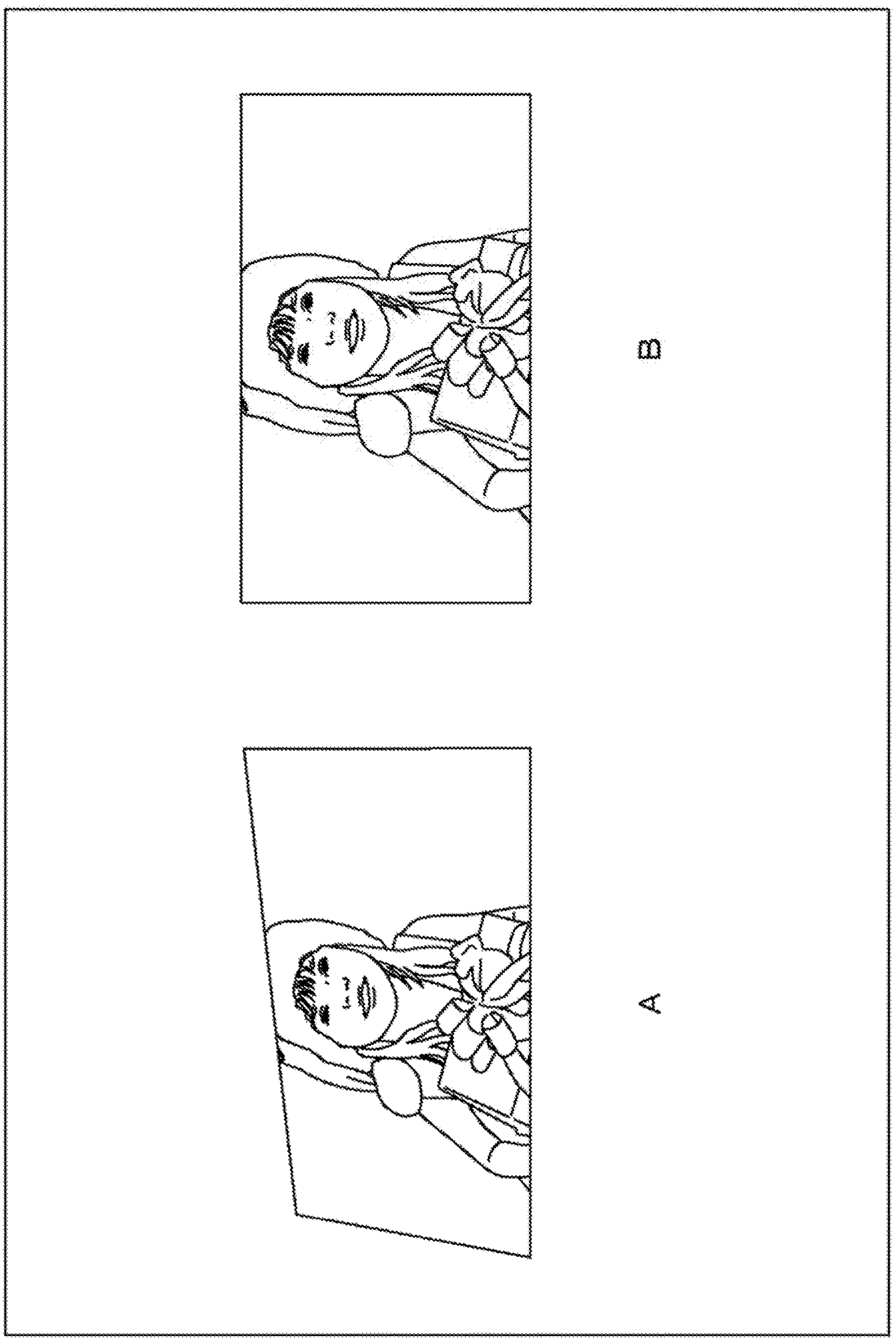
FIG. 1 depicts diagrams illustrating an example of how geometric corrections are conducted.

There are cases in which an image that is projected (also referred to as a projected image) becomes distorted and difficult to see as illustrated, for example, in A of FIG. 1 depending on the attitude (e.g., position, orientation) of the projector relative to the projection plane (e.g., screen, wall), a shape of the projection plane, and so on. In such a case, an image projected by a projector can be rendered easier to see by reducing the distortion of the projected image as illustrated in the example in B of FIG. 1 through geometric corrections such as distortion correction.

Figure 2:
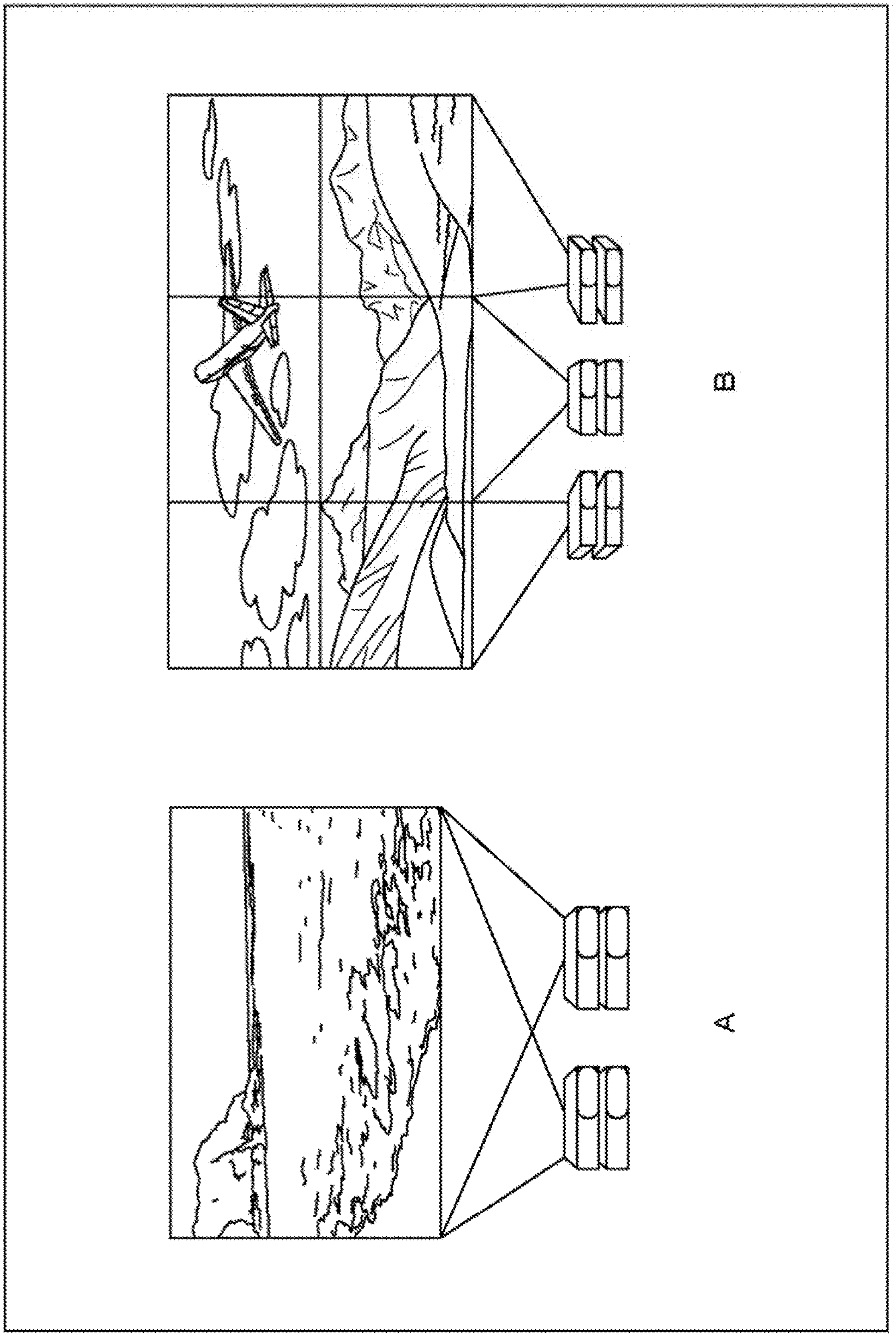
FIG. 2 depicts diagrams illustrating an example of how geometric corrections are conducted.

Also, there is a system that forms a projected image by projecting images with a plurality of projectors as illustrated in the example in FIG. 2. For example, there is a method that enhances a contrast ratio and realizes a high dynamic range by projecting images at the same position from a plurality of projectors as illustrated, for example, in A of FIG. 2. Also, there is a method that realizes a projected image larger than that projected by a single projector (projected image with higher resolution than that projected by a single projector) by arranging projected images projected from respective projectors as illustrated, for example, in B of FIG. 2. In the case of these methods, an inappropriate positional relationship between projected images projected by the respective projectors may lead to overlap of projected images due to their displacement or result in reduced quality of the projected image as a whole due to unnecessary gap. Therefore, there is a case in which not only distortion correction on each projected image as described above but also correction of alignment between projected images (e.g., shift and zoom) are necessary. Further, there is a case in which corrections are required to maintain the brightness, color, and so on uniform in projected images.

In the present specification, corrections of a projected image such as deformation, movement, enlargement, and reduction that change the position of each pixel of the projected image on a projection plane will be referred to as geometric corrections. That is, geometric corrections include not only those performed by image processing but also those performed by controlling optics such as shifting or zooming and those performed by controlling the position, attitude, and so on of the projection section.

Figure 3:
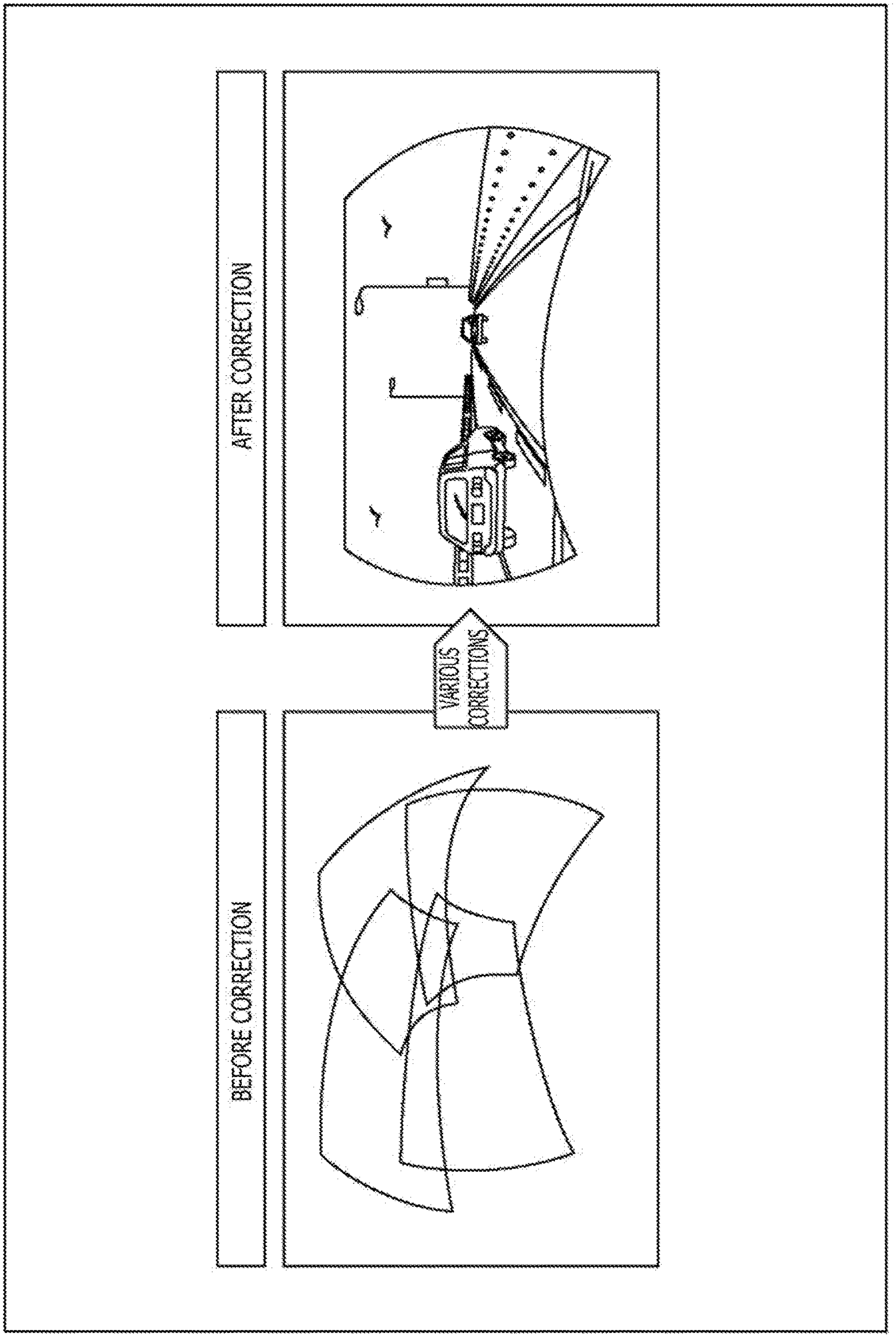
FIG. 3 is a diagram illustrating an example of how geometric corrections are conducted.

By using such geometric corrections, it is possible to realize complicated multi-projection such as forming a single projected image by projecting images onto a curved projection plane from a plurality of projectors as illustrated, for example, in FIG. 3.

Such geometric corrections can be performed manually by an operator of the projectors. However, this may require cumbersome tasks. In particular, it is not easy to manually realize complicated geometric corrections as in the example illustrated in FIG. 3. Even if such corrections are realized, it is highly likely that a large amount of time will be required. For this reason, a method was devised that captures a projected image projected by a projector using a camera and achieves setups for geometric corrections using the captured image.

In that case, corresponding points between the projected and captured images (pixels in the projected and captured images corresponding to the same position on the projection plane) are found from these images, thereby allowing correspondence to be found between each camera pixel and each projector pixel. Then, projector and camera attitudes are estimated, and a screen shape is estimated on the basis of the correspondence, and setups for geometric corrections are achieved using these estimation results.

Figure 4:
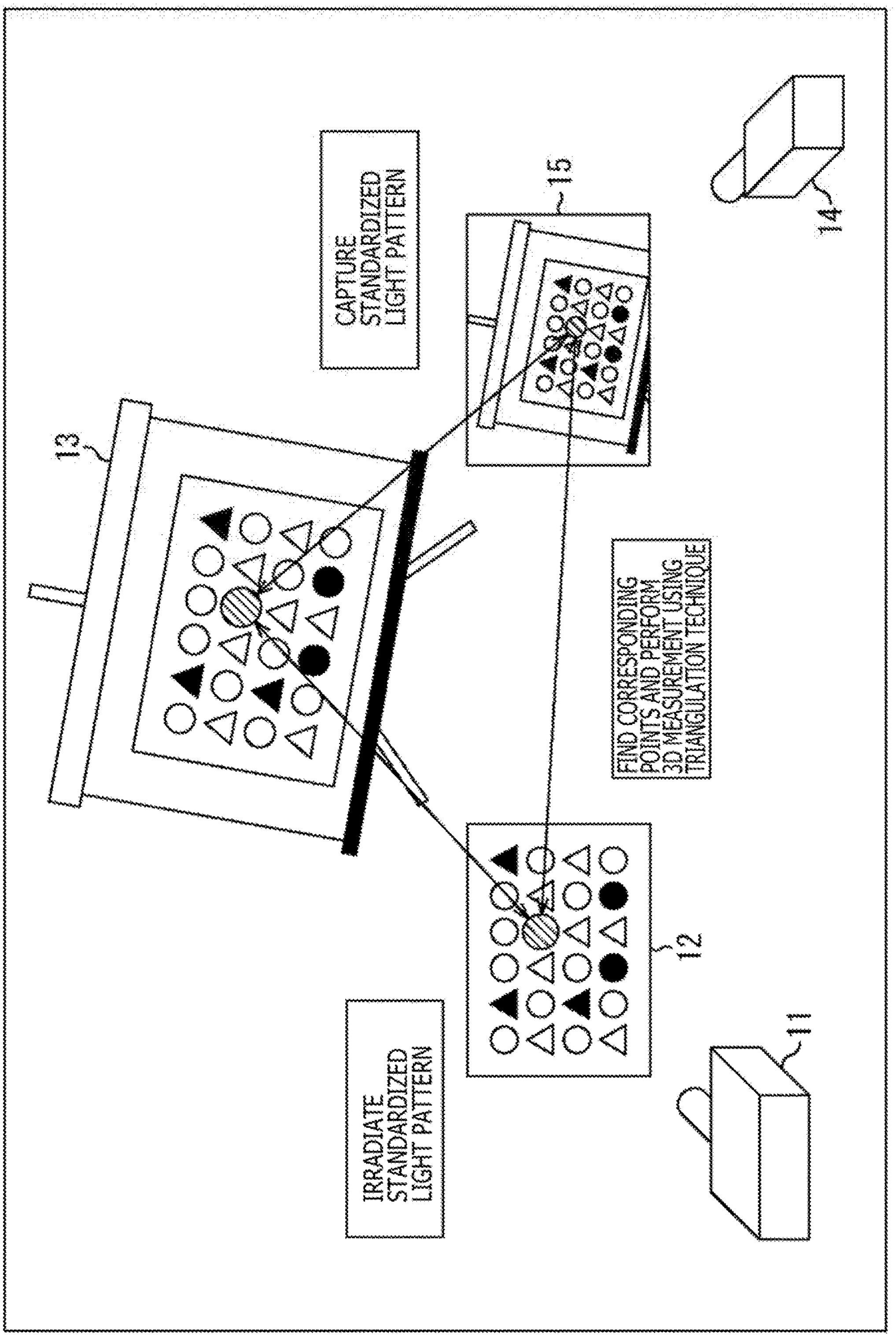
FIG. 4 is a diagram illustrating an example of how corresponding point detection is conducted.

For example, as illustrated in FIG. 4, a captured image 15 is acquired by projecting a standardized light pattern 12 having a given design from a projector 11 onto a screen 13 and capturing an image of the standardized light pattern 12 with a camera 14. Then, corresponding points between the standardized light pattern 12 and the captured image 15 are found on the basis of the design of the standardized light pattern 12, followed by finding the attitudes of (a positional relationship between) the projector 11 and the camera 14, a shape of the screen 13, and so on using triangulation or other technique, and setups for geometric corrections are achieved on the basis of results the corresponding points.

When an image is projected, geometric corrections are performed in accordance with these setups, thereby realizing complicated geometric corrections as in the example of FIG. 3 with ease.

It should be noted that in the case where a plurality of projectors (projection/capture apparatuses) are used, for example, as illustrated in FIGS. 2 and 3, it is necessary to align the projected images as described above. That is, it is necessary to find not only corresponding points between the camera and projector pixels within the projection/capture apparatus but also corresponding points between the camera and projector pixels across the projection/capture apparatuses. It should be noted that in the case where a large projected image is formed by arranging a plurality of projected images side by side as in the examples illustrated in B of FIG. 2 and in FIG. 3, the alignment thereof can be facilitated by partially superimposing the adjacent projected images (causing the adjacent projected images to overlap) (for example, in FIG. 3).

Figure 5:
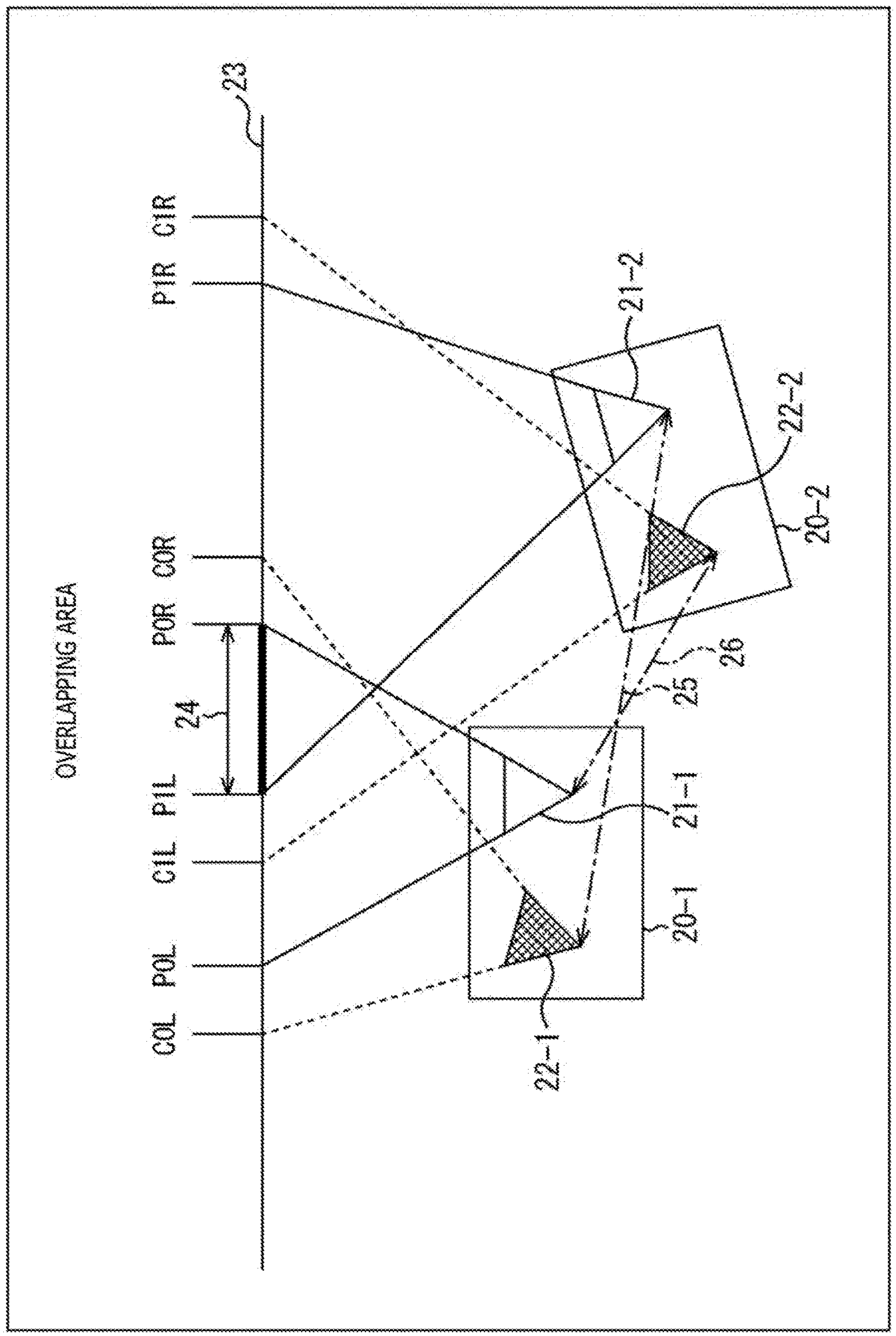
FIG. 5 is a diagram illustrating an example of how corresponding point detection is conducted.

For example, as illustrated in FIG. 5, a projection/capture apparatus 20-1 having a projection section 21-1 (projector) and a capture section 22-1 (camera) and a projection/capture apparatus 20-2 having a projection section 21-2 (projector) and a capture section 22-2 (camera) are operated in a coordinated manner. Here, in the case where there is no need to distinguish between the projection/capture apparatus 20-1 and the projection/capture apparatus 20-2 for description, the two apparatuses will be referred to as the projection/capture apparatuses 20. Also, in the case where there is no need to distinguish between the projection section 21-1 and the projection section 21-2 for description, the two sections will be referred to as the projection sections 21. Further, in the case where there is no need to distinguish between the capture section 22-1 and the capture section 22-2 for description, the two sections will be referred to as the capture sections 22.

As illustrated in FIG. 5, a projected area (projected image range) of a projection plane 23 by the projection section 21-1 of the projection/capture apparatus 20-1 spans from P0L to P0R. Also, a projected area of the projection plane 23 by the projection section 21-2 of the projection/capture apparatus 20-2 spans from P1L to P1R. That is, the range indicated by two arrows 24 (range of P1L to P0R) is an overlapping area where the two projected images are superimposed.

It should be noted that a capture area of the projection plane 23 by the capture section 22-1 of the projection/capture apparatus 20-1 (range included in the projected image) spans from C0L to C0R. Also, a capture area of the projection plane 23 by the capture section 22-2 of the projection/capture apparatus 20-2 (range included in the captured image) spans from C1L to C1R.

Figure 6:
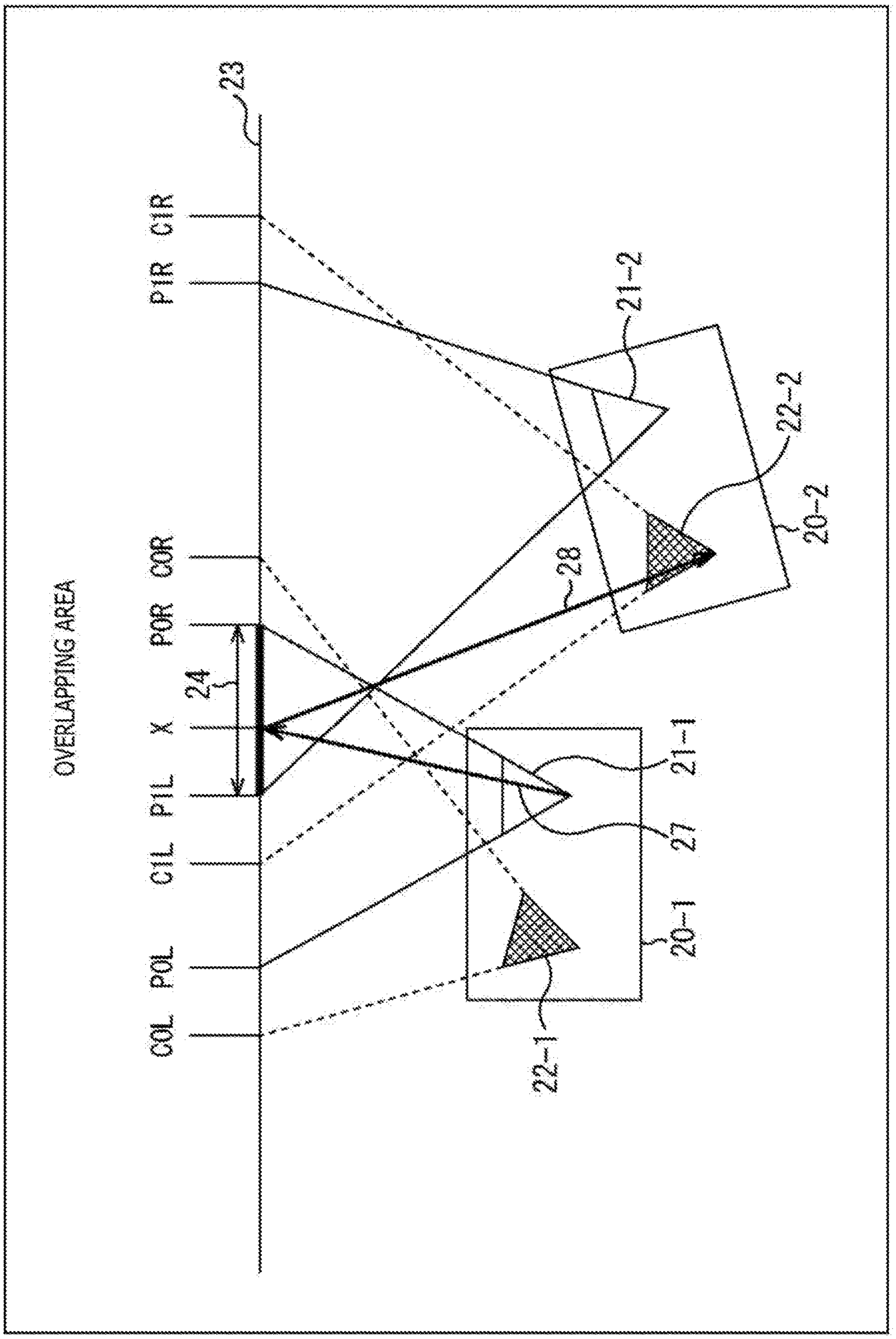
FIG. 6 is a diagram illustrating an example of how corresponding point detection is conducted.

In the case of such a system, it is necessary to find not only corresponding points between the projection section 21 and the capture section 22 in each of the projection/capture apparatuses 20 but also corresponding points between the projection section 21 and the capture section 22 across the projection/capture apparatuses 20 as described above. For this reason, for example, after reflection of light irradiated from a pixel of the projection section 21-1 (arrow 27) at 'X' on the projection plane 23, by which pixel of the capture section 22-2 the light is received (arrow 28) as illustrated in FIG. 6 is found. Also, similar pixel-to-pixel correspondence is found between the projection section 21-2 and the capture section 22-2.

Thus, by using the overlapping area (range indicated by the two arrows 24), it is possible to easily find corresponding points between the projection section 21 and the capture section 22 across the projection/capture apparatuses 20. Then, by achieving setups for geometric corrections using these corresponding points, it is possible to easily perform distortion correction and alignment in each of the projected images projected by the projection section 21 of each of the projection/capture apparatus 20.

Figure 7:
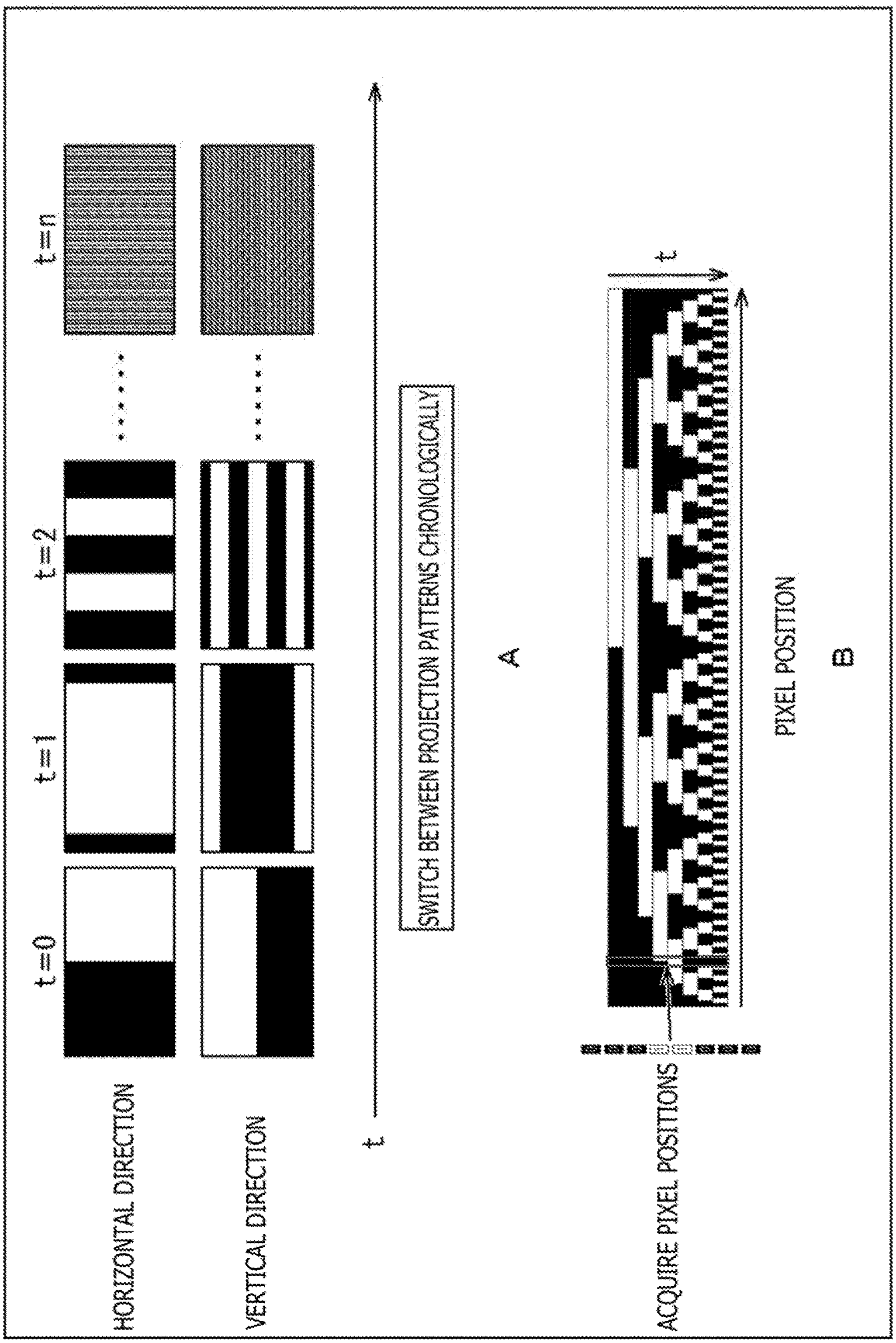
FIG. 7 depicts diagrams illustrating an example of a Gray code.

As such a corresponding point detection method, there is a method in which a pattern image having a given pattern is projected, the projected image is captured, and corresponding points are detected, on the basis of the pattern image included in an acquired captured image, between the projected image and the captured image. There is a method that uses, for example, a Gray code as such a pattern. For example, each of given pattern images as illustrated in A of FIG. 7 is captured while at the same time switching between the images chronologically from one to the other. Then, when all the pattern images are captured, a '1' (white) or '0' (black) of each captured pattern is detected in each pixel of the captured image, and a variation pattern of '1s' and '0s' is decoded as illustrated in B of FIG. 7, thereby acquiring projector pixel positions. This makes it possible to acquire pixel correspondence.

However, assuming that pattern image projection and content image projection have an exclusive relationship, this means that corresponding points cannot be detected during content image projection. For example, therefore, in the case where a deviation occurs between corresponding points due to impact of disturbances such as temperature and vibration, it has been necessary to suspend content viewing and redo corresponding point detection or continuously project a content image without redoing corresponding point detection in such a manner as not to interrupt content viewing. In each case, there has been a substantial likelihood of reduced subjective image quality of the projected image for the user who is viewing content.

<Online Sensing>

For this reason, methods (online sensing) have been devised that detect corresponding points while continuously projecting a content image.

As online sensing techniques, for example, a scheme that uses invisible light such as infrared light, a scheme that uses image feature quantities such as SIFT, an ISL (Imperceptible Structured Light) scheme, and so on have been devised. In the case of the scheme using invisible light such as infrared light, there has been a likelihood of increased cost due to necessity for an additional projector that projects invisible light (e.g., infrared projector). Also, in the case of the scheme using image feature quantities such as SIFT, the accuracy and density with which corresponding points are detected depend on projected image content, thereby making it difficult to detect corresponding points with stable accuracy.

In contrast to these schemes, the ISL scheme keeps increase in system configuration elements (i.e., increased cost) to a minimum. Also, the ISL scheme permits corresponding point detection with stable accuracy independently of a projected image.

<ISL Scheme>

In the ISL scheme, a pattern image, an image having a given pattern, is embedded in a content image and projected in a manner imperceptible by humans by using an integral effect. Then, corresponding points are found by using the pattern image.

Figure 8:
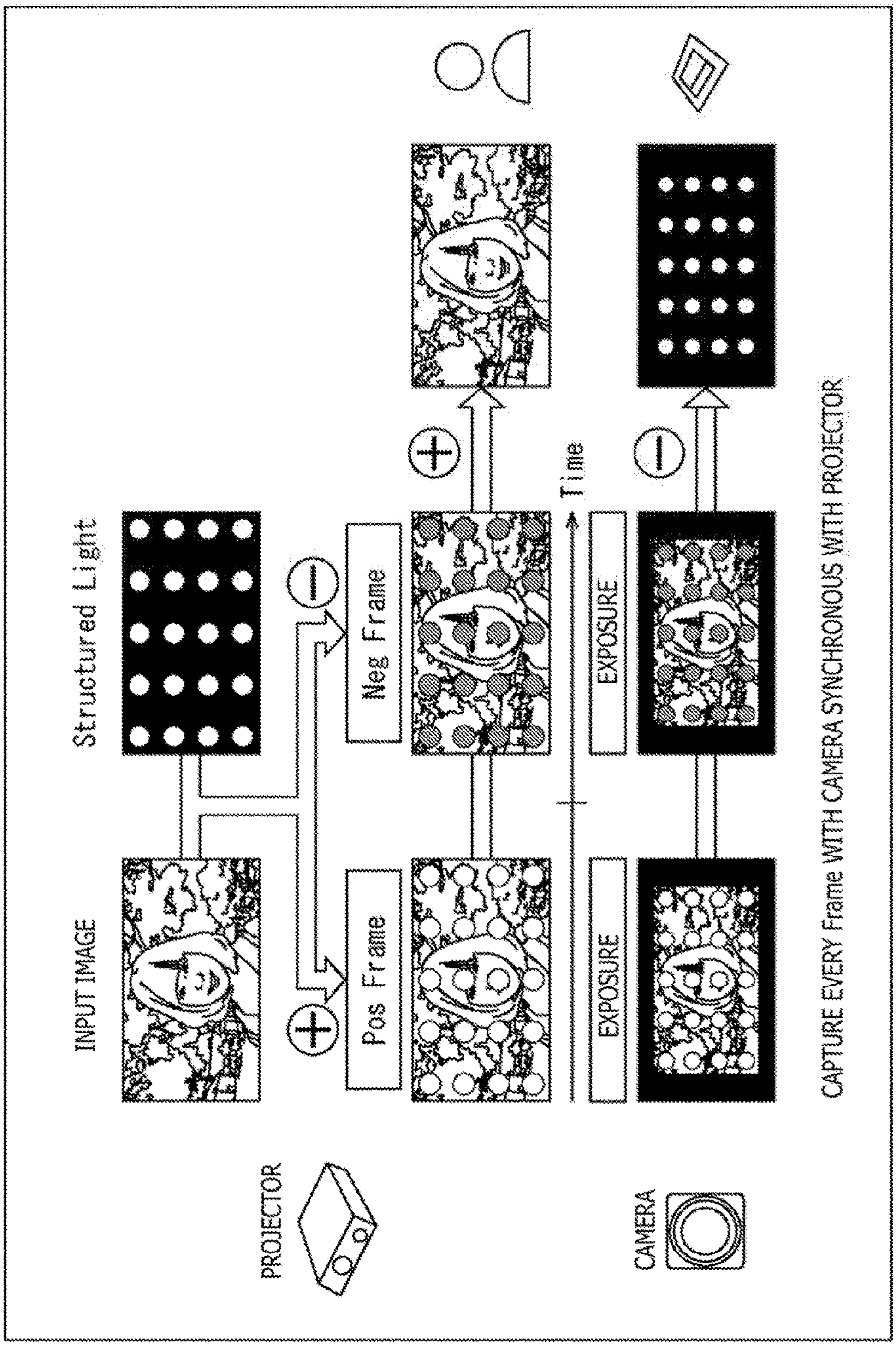
FIG. 8 is a diagram describing an example of ISL.

Describing more specifically, positive and negative images of a given pattern image (Structured Light) are superimposed on an input image (content image) as illustrated, for example, in FIG. 8, thereby generating two frames, a positive frame (Pos Frame) and a negative frame (Neg Frame). These two frames are projected from a projector. The positive and negative images of the pattern image are opposite in direction of luminance change in the pattern (e.g., white and black). Therefore, when these two frames are projected from a projector, it is difficult for the user to perceive the pattern image (positive and negative images) due to an integral effect.

In contrast, a camera operates in synchronism with the projector and captures each of the projected images of these two frames. The captured images include the positive and negative images of the pattern image, individually. Therefore, the pattern image is extracted by finding the difference between these captured images.

Thus, in the case of the ISL scheme, positive and negative images of a pattern image are superimposed on an input image of the same frame. That is, in the case where the input image is, for example, a 60 Hz frame rate video, the projector must project the image at twice the frame rate (120 Hz). In order to do so, it is necessary to double the frame rate by using an SOC (System On a Chip) at the preceding stage of a panel driver as in the example of A of FIG. 9 or by using the panel driver itself as in the example of B of FIG. 9.

Figure 9:
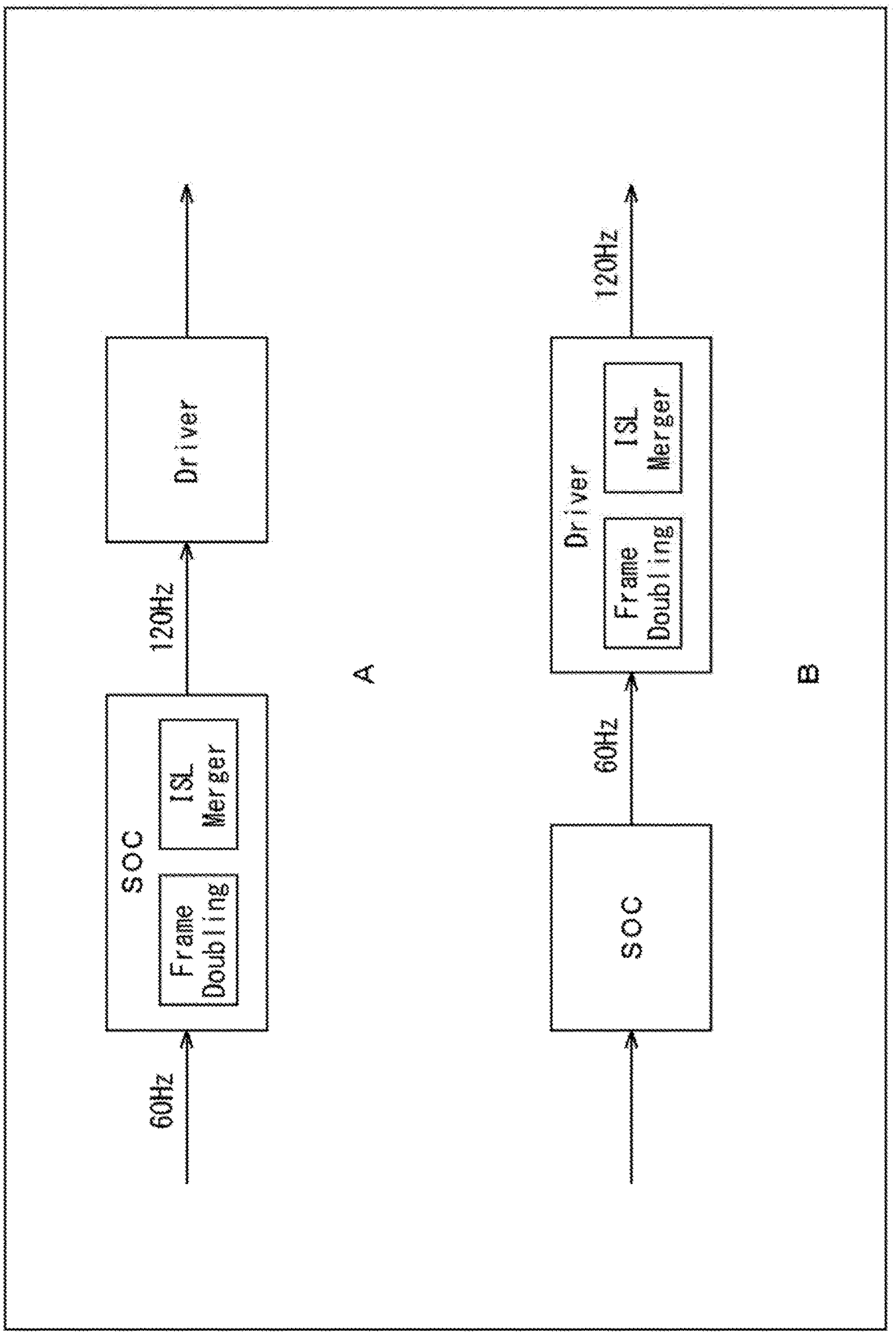
FIG. 9 depicts diagrams describing a configuration example of a device that realizes ISL.

That is, a new projector having a configuration as illustrated in the examples of FIG. 9 must be made available solely in order to realize corresponding point detection based on the ISL scheme, possibly resulting in increased development and manufacturing costs.

<Realizing the ISL Scheme Using a Single-Panel Projector Device>

For this reason, the ISL scheme is realized by using a single-panel projector device. One device among projector devices uses a reflective liquid crystal panel called LCOS (Liquid crystal on silicon) (registered trademark). This LCOS has a liquid crystal panel fabricated on a silicon substrate, drives liquid crystal from the rear side of the substrate, and projects a picture by causing the liquid crystal to reflect light. The LCOS is characterized in that it offers a high aperture ratio thanks to formation of circuitry under pixel electrodes. As projection schemes using LCOS, two schemes, a single-panel scheme and a tri-panel scheme, are currently available. In the tri-panel scheme, a display chip is provided for each color, and images of respective colors (e.g., red, green, and blue) generated by the respective display chips are optically combined and projected. In contrast, in the single-panel scheme, only one display chip is provided. Images of respective colors (e.g., red, green, and blue) are generated by dividing the single display chip in time and are projected in succession.

That is, a single-panel projector device transforms each frame of a video into a plurality of subframes and sequentially projects each subframe during projection time of one frame (during one vertical synchronization period (1V)). As for each subframe image, projection of one frame's worth of each subframe image is rendered equivalent to projection of that one frame image. For example, each subframe image may be an image of a given color component (e.g., red, green, or blue component) of a frame image corresponding to the subframes of a video. In that case, assignment of an image of each color component to a subframe need only be such that when sequentially projected, all the subframe images look to the viewing user as if they were a single-frame image as a result of mixture of the respective color components because of an integral effect. It should be noted that although the number of subframes corresponding to a frame is arbitrary, the larger the number, the less likely a "color breaking phenomenon," a phenomenon in which one perceives switching between colors, will occur.

Figure 10:
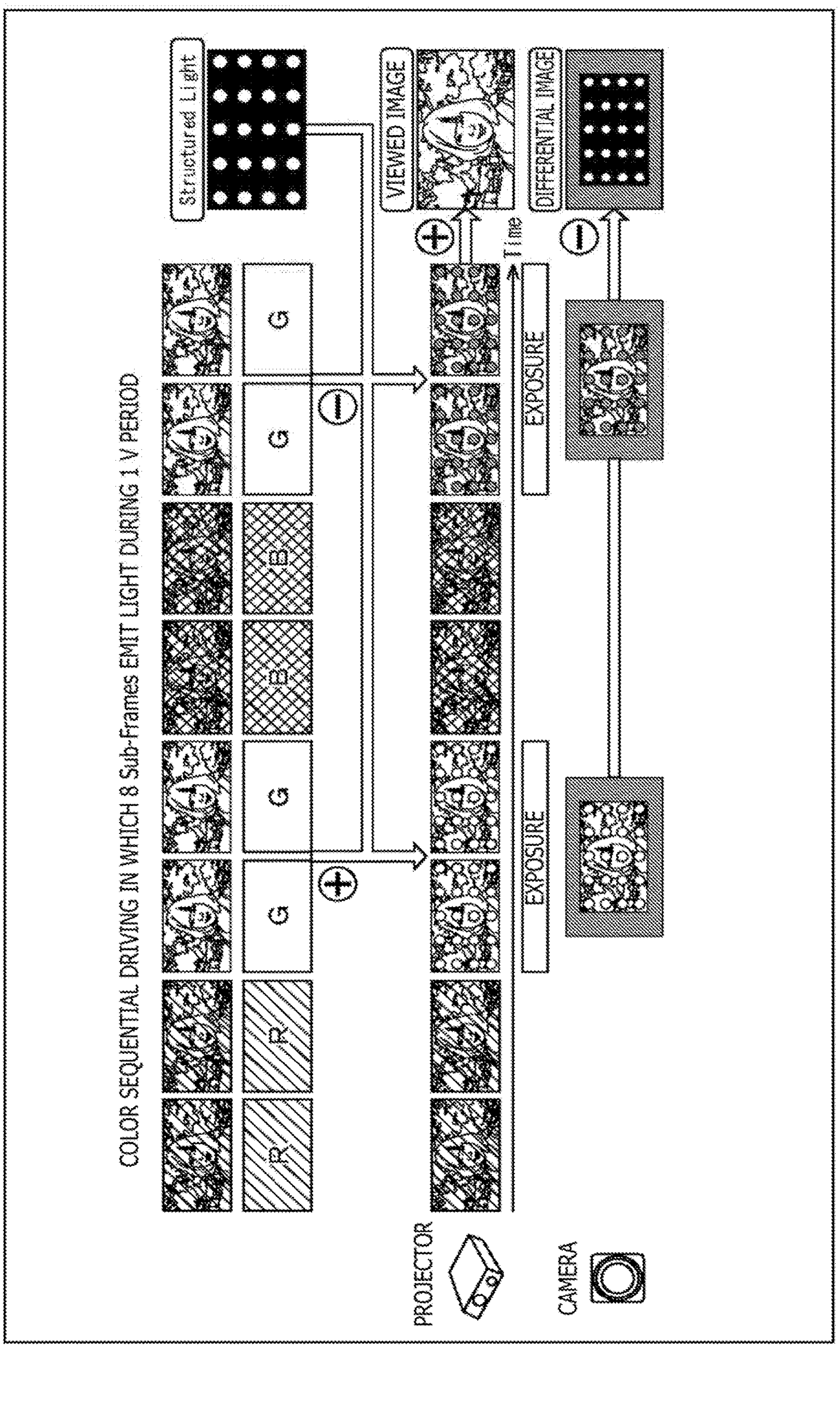
FIG. 10 is a diagram describing an example of overview of sensing based on an ISL scheme in a single-panel device.

In the case of FIG. 10, for example, a single-panel projector transforms a frame into eight subframes (Sub-Frame) and sequentially projects these eight subframes during one vertical synchronization period (1V). Also, this projector sequentially projects three primary color components of the frame image as subframe images (color sequential driving). More specifically, the projector projects two frames' worth of red component images of the frame image, projects two frames' worth of green component images, projects two frames' worth of blue component images, and projects two frames' worth of green component images again. A red component image subframe of a frame image will be also referred to as a red component subframe. Similarly, a green component image subframe of a frame image will be referred to as a green component subframe, and a blue component image subframe of a frame image will be referred to as a blue component subframe.

That is, the projector projects the subframe images at eight times the video frame rate. For example, assuming that the video frame rate is 60 Hz, the projector is driven such that the subframes are projected at 480 Hz.

That is, a single-panel projector is driven faster than the frame rate of the video projected. Realizing corresponding point detection based on the ISL scheme using such a single-panel projector device eliminates the need to drive the projector device faster than normal for the ISL scheme, thereby eliminating the need to develop a projector device having new specifications and keeping increase in development and manufacturing costs to a minimum. That is, it is possible to realize the ISL scheme that permits corresponding point detection during content viewing while at the same time keeping cost increase to a minimum.

In the case of a single-panel projector, each frame of a video is transformed into subframes as described above. However, even if a pattern image is superimposed on a frame image followed by transformation into subframes as is conventionally done, it is difficult to extract the pattern image from a captured image of a projected image of each subframe. Also, with this method, it is impossible to superimpose positive and negative images of a pattern image on the same frame.

For this reason, a pattern image is superimposed on a subframe image. That is, a pattern image including a given pattern is superimposed on any one of a plurality of subframes corresponding to a frame, and respective subframe images are sequentially projected. The number of subframes on which a pattern image is superimposed is arbitrary unless all the plurality of subframes corresponding to a frame are selected, and there may be one or more than one subframes. This makes it possible to realize corresponding point detection based on the ISL scheme using a single-panel projector device.

It should be noted that a pattern image may be superimposed on a subframe image having a highly luminous color component. For example, the pattern image may be superimposed on a green component subframe image. In the case of the example in FIG. 10, the projector superimposes the pattern image on the green component subframe images. The green component is more luminous than the red and blue components. By superimposing the pattern image on the images having such a highly luminous color component, it is possible to enhance the S/N ratio of the pattern image in pattern image extraction. That is, it is possible to extract the pattern image with more accuracy.

Also, it is possible to improve the invisibility of the pattern image in a viewed image thanks to an integral effect by superimposing the pattern image as positive and negative images.

Further, the positive and negative images may be superimposed on different subframe images having the same color component and project the subframe images. In the case of the example in FIG. 10, the projector superimposes the positive image on the two subframe images of the green component subframe that are projected first and superimposes the negative image on the two subframe images of the green component subframe that are projected later. If the positive and negative images have different color components, it is more likely that the user will see the pattern image in the viewed image, resulting in a higher likelihood of the frame image remaining in a differential image. That is, superimposition of positive and negative images on images having the same color component keeps reduction in invisibility of the pattern image to a minimum in the viewed image and keeps reduction in S/N ratio of the pattern image to a minimum in the differential image.

It should be noted that an arbitrary design can be selected for the pattern image. That is, the design of the pattern image is arbitrary.

Then, a camera is driven in synchronism with projection by the single-panel projector as described above, and a projected image projected by the projector is captured by the camera. This ensures reliable capture of a projected subframe image on which a pattern image is superimposed. In the case of the example in FIG. 10, the camera captures only the projected green component subframe image on which the pattern image has been superimposed. This makes it possible to omit capture of unnecessary subframe images, thereby keeping increase in load caused by unnecessary capture to a minimum.

It should be noted that, in the case of the example in FIG. 10, the projector projects, in succession, two green component subframes on which the pattern image has been superimposed. This allows the camera to perform exposure during two frames' worth of period, thereby achieving capture with higher sensitivity. Also, it is possible to reduce the driving speed as compared to the case in which one subframe image is captured, thereby keeping increase in capture-related load to a minimum.

2. First Embodiment

<Projection/Capture System>

Figure 11:
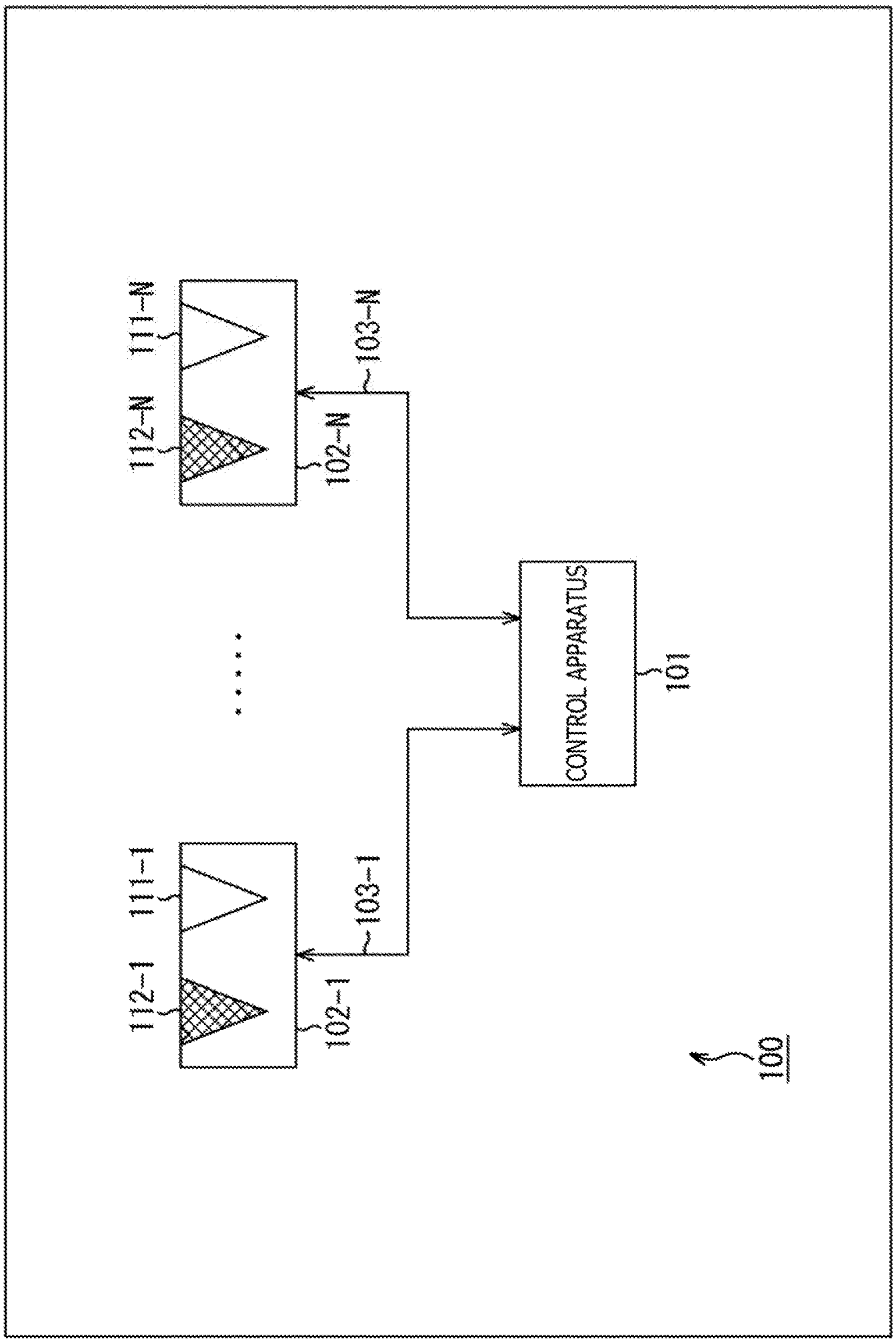
FIG. 11 is a block diagram illustrating an example of a main configuration of a projection/capture system.

FIG. 11 is a block diagram illustrating an example of a main configuration of a projection/capture system to which the present technology is applied. In FIG. 11, a projection/capture system 100 is a system capable of performing corresponding point detection based on the ISL scheme by using methods to which the present technology is applied including image projection and projected image capture.

As illustrated in FIG. 11, the projection/capture system 100 includes a control apparatus 101 and projection/capture apparatuses 102-1 to 102-N (where N is an arbitrary natural number). The projection/capture apparatuses 102-1 to 102-N are connected to the control apparatus 101 via cables 103-1 to 103-N, respectively.

In the description given below, in the case where there is no need to distinguish between the projection/capture apparatuses 102-1 to 102-N for description, they will be referred to as the projection/capture apparatuses 102. Also, in the case where there is no need to distinguish between the cables 103-1 to 103-N for description, they will be referred to as the cables 103.

The control apparatus 101 controls each of the projection/capture apparatuses 102 via the cable 103. For example, the control apparatus 101 supplies an image to be projected to each of the projection/capture apparatuses 102, thereby causing the image to be projected. Also, for example, the control apparatus 101 issues an instruction to each of the projection/capture apparatuses 102 to capture a projected or other image, thereby acquiring a captured image thereof. Further, for example, the control apparatus 101 detects corresponding points between the projected and captured images. Also, the control apparatus 101 estimates the attitude of each of the projection/capture apparatuses 102 on the basis of the corresponding points found, reconfigures a screen (projection plane), and performs geometric corrections on the image to be projected by each of the projection/capture apparatuses 102.

For example, the control apparatus 101 may perform, for example, image processing such as enlargement, reduction, and deformation of the image to be projected as these geometric corrections. Also, the control apparatus 101 may control projection and capture directions and so on of optics of each of the projection/capture apparatuses 102 as these geometric corrections. Of course, the control apparatus 101 may perform both thereof.

The projection/capture apparatuses 102-1 to 102-N include projection sections 111-1 to 111-N that project images and capture sections 112-1 to 112-N that capture images of a subject, respectively. In the description given below, in the case where there is no need to distinguish between the projection sections 111-1 to 111-N, they will be referred to as the projection sections 111. Also, in the case where there is no need to distinguish between the capture sections 112-1 to 112-N, they will be referred to as the capture sections 112.

The projection section 111 has a so-called projector function. That is, the projection/capture apparatus 102 can be driven as a projector by using the projection section 111. For example, the projection/capture apparatus 102 can project an image supplied from the control apparatus 101 onto an arbitrary projection plane using the projection section 111.

The capture section 112 has a so-called camera function. That is, the projection/capture apparatus 102 can be driven as a camera by using the capture section 112. For example, the projection/capture apparatus 102 can capture an image of a projection plane onto which an image is projected by the projection section 111. It should be noted that the projection/capture apparatus 102 further has a communication function to communicate with the control apparatus 101. For example, the projection/capture apparatus 102 can supply captured image data, acquired by the capture section 112, to the control apparatus 101 by using the communication function.

The number of projection/capture apparatuses 102 is arbitrary, and there may be one or more than one projection/capture apparatuses 102. In the case where there are two or more projection/capture apparatuses 102, the projection/capture apparatuses 102 can not only operate independently of each other but also operate in a coordinated fashion under control of the control apparatus 101, thereby making it possible to project images as described with reference to FIGS. 2 and 3. In the case where the projection/capture apparatuses 102 operate in a coordinated fashion, the projection/capture system 100 functions as a so-called multi-projection system, making it possible to realize so-called projection mapping.

It should be noted that it may be possible to control parameters of the projection section 111 regarding projection such as image projection direction, enlargement factor, distortion correction in projected image, and so on. Also, it may be possible to control, for example, the position and attitude of optics of the projection section 111 and the position, attitude, and so on of the projection section 111 as a whole in order to control the parameters regarding projection.

Also, it may be possible to control, for example, parameters of the capture section 112 regarding capture such as capture direction, view angle, distortion correction in a captured image, and so on. Also, it may be possible to control, for example, the position and attitude of optics of the capture section 112 and the position, attitude, and so on of the capture section 112 as a whole in order to control the parameters regarding capture.

Further, it may be possible to control the projection section 111 and the capture section 112 independently of each other. Also, it may be possible to control the position and attitude of the projection/capture apparatus 102. It should be noted that such control over the projection section 111, the capture section 112, and the projection/capture apparatus 102 may be handled by the control apparatus 101 or by an external apparatus other than the control apparatus 101 such as the projection/capture apparatus 102, for example.

The cable 103 is an electrical communication cable that is arbitrary communication standards and connects the control apparatus 101 and the projection/capture apparatus 102 in a manner that permits communication. That is, the cable 103 can be a communication medium between the control apparatus 101 and the projection/capture apparatus 102. It should be noted that, in the projection/capture system 100, the control apparatus 101 and the projection/capture apparatus 102 need only be connected in a manner that permits communication and that the control apparatus 101 and the projection/capture apparatus 102 may be connected through wireless communication. In that case, the cable 103 can be omitted.

As described above, the control apparatus 101 detects corresponding points between projected and captured images. That is, the control apparatus 101 finds pixel-to-pixel correspondence between each projection section 111 and each capture section 112. At that time, the control apparatus 101 detects corresponding points through the ISL scheme of online sensing. At that time, the control apparatus 101 detects corresponding points by using a method to which the present technology is applied.

<Control Apparatus>

Figure 12:
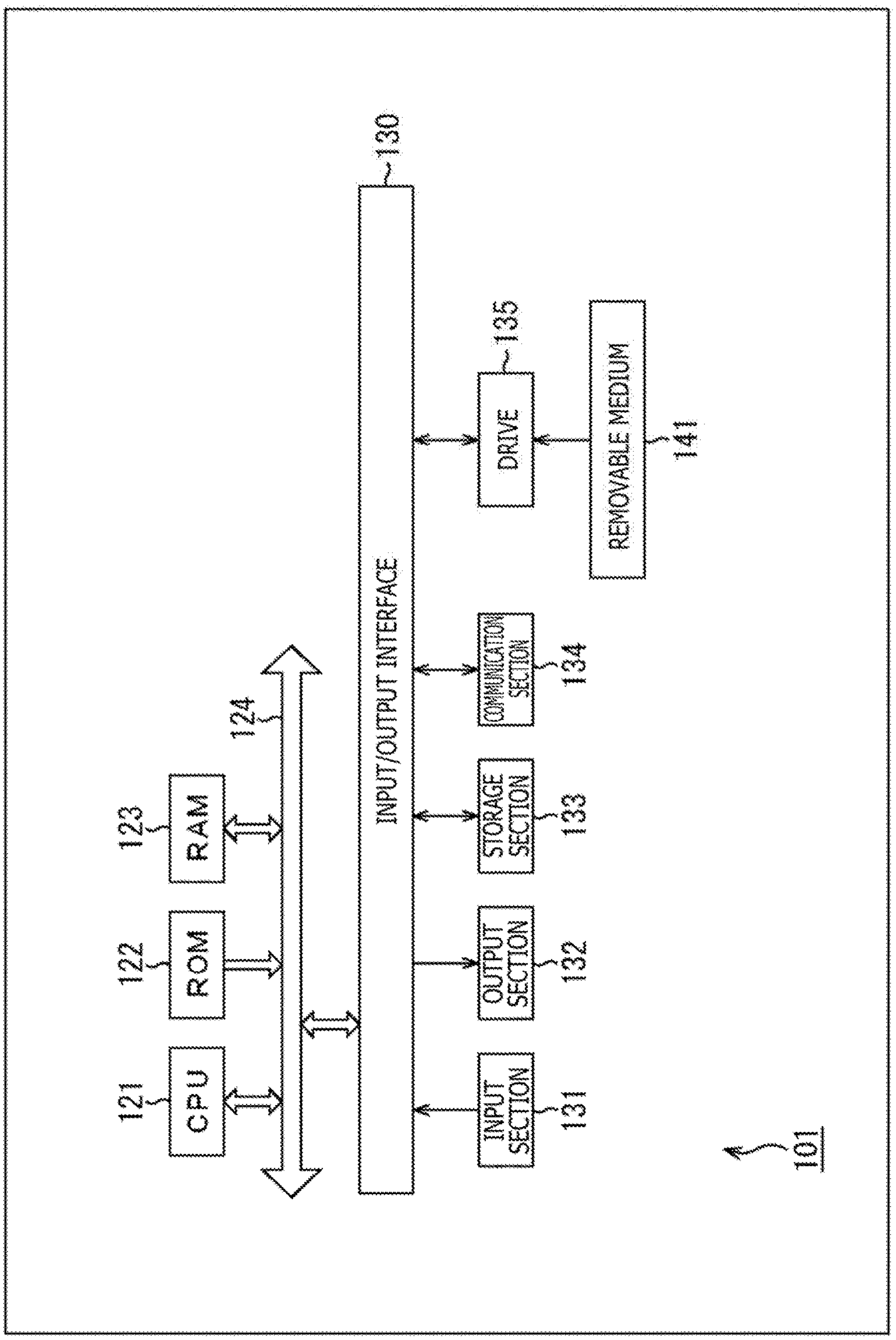
FIG. 12 is a block diagram illustrating an example of a main configuration of a control apparatus.

FIG. 12 is a block diagram illustrating an example of a main configuration of the control apparatus 101, an embodiment of the image processing apparatus to which the present technology is applied.

As illustrated in FIG. 12, the control apparatus 101 includes a CPU 121, a ROM 122, a RAM 123, a bus 124, an input/output interface 130, an input section 131, an output section 132, a storage section 133, a communication section 134, and a drive 135.

The CPU 121, the ROM 122, and the RAM 123 are connected to each other via the bus 124. The input/output interface 130 is also connected to the bus 124. The input section 131, the output section 132, the storage section 133, the communication section 134, and the drive 135 are connected to the input/output interface 130.

The CPU 121 loads, for example, a program stored in the ROM 122 or the storage section 133 into the RAM 123 for execution, thereby allowing various processes to be performed. Data required for the CPU 121 to perform a variety of processes is also stored in the RAM 123 as appropriate.

For example, the CPU 121 can perform processes regarding corresponding point detection by executing such a program and so on.

The input section 131 includes, for example, an input device that accepts arbitrary external information such as user input. This input device may be a device of any kind. For example, the input device may be a keyboard, a mouse, an operating button, a touch panel, a camera, a microphone, a barcode reader, or other device. Also, the input device may be one of various kinds of sensors such as acceleration sensor, optical sensor, temperature sensor, and so on. Further, the input device may be an input terminal that accepts arbitrary external information as data (signal). The output section 132 includes an output device that outputs arbitrary information inside the apparatus such as image or voice. This output device may be a device of any kind. For example, the output device may be a display or a speaker. Also, the output device may be an output terminal that externally outputs arbitrary information as data (signal).

The storage section 133 includes a storage medium that stores programs, data, and so on. This storage medium may be a medium of any kind. For example, the storage medium may be a hard disk, a RAM disk, a non-volatile memory, or other medium. The communication section 134 includes a communication device that engages in communication for exchanging information such as programs and data with external apparatuses via a given communication medium (e.g., arbitrary network such as the Internet). This communication device may be a device of any kind. For example, the communication device may be a network interface. The communication section 134 may use an arbitrary communication method and an arbitrary communication standard for communication. For example, the communication section 134 may be capable of wired communication, wireless communication, or both thereof.

The drive 135 performs processes related to reading and writing information (e.g., programs and data) from and to a removable medium 141 inserted in itself. The removable medium 141 may be a recording medium of any kind. For example, the removable medium 141 may be a magnetic disk, an optical disc, a magneto-optical disk, a semiconductor memory, or other medium. For example, the drive 135 reads information (e.g., programs and data) stored in the removable medium 141 that is inserted in itself and supplies the information to the CPU 121, the RAM 123, or other section. Also, for example, the drive 135 acquires information (e.g., programs and data) supplied from the CPU 121, the RAM 123, or other section and writes the information to the removable medium 141 inserted in itself.

<Functional Blocks of the Control Apparatus>

Figure 13:
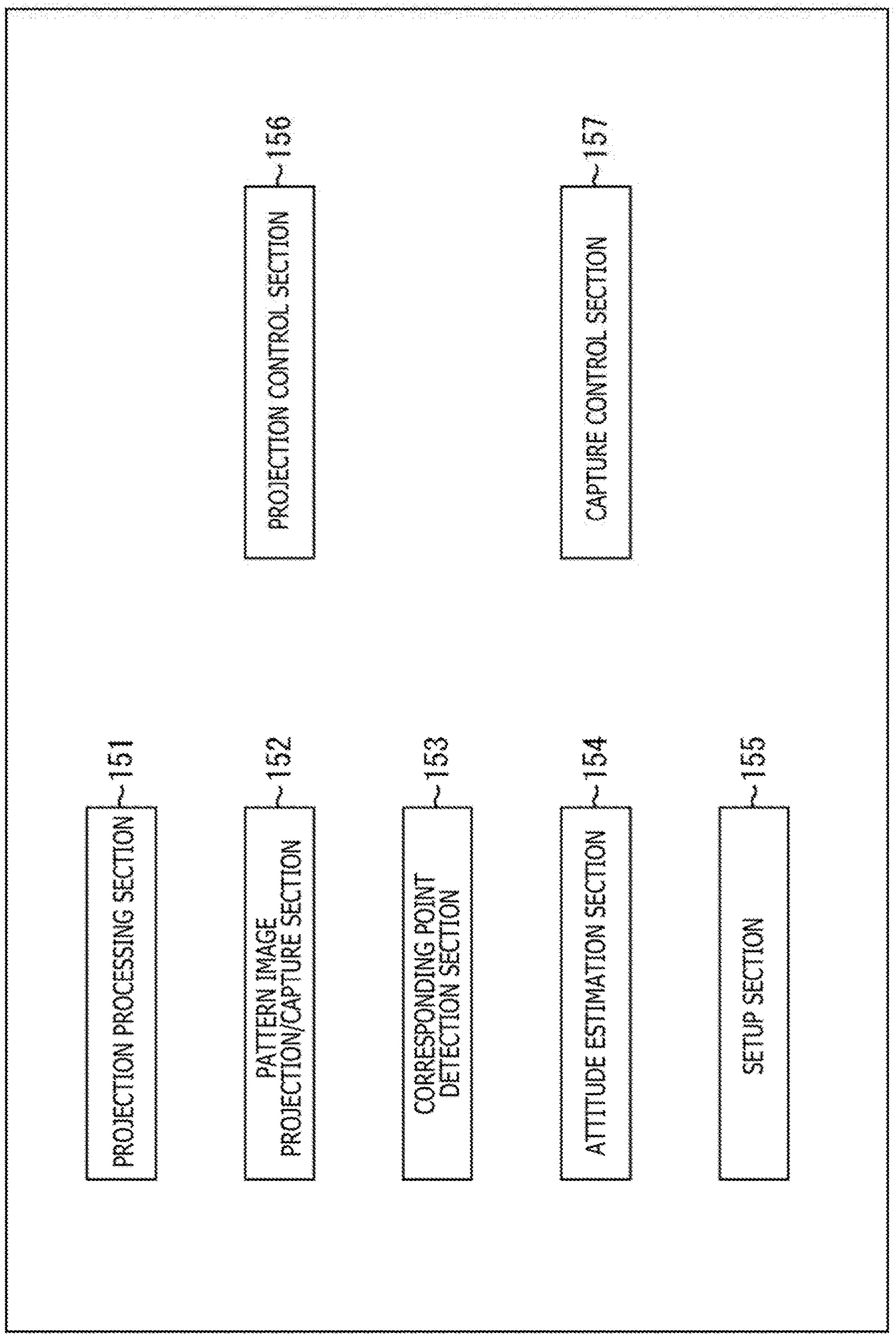
FIG. 13 is a functional block diagram illustrating examples of functions realized by the control apparatus.

FIG. 13 is a functional block diagram illustrating examples of functions realized as a result of execution of a program and so on by the control apparatus 101. As illustrated in FIG. 13, the control apparatus 101 has functions of a projection processing section 151, a pattern image projection/capture section 152, a corresponding point detection section 153, an attitude estimation section 154, a setup section 155, a projection control section 156, and a capture control section 157 as a result of execution of a program.

The projection processing section 151 performs processes related to projection of content (video). The pattern image projection/capture section 152 performs processes related to projection and capture of a pattern image. The corresponding point detection section 153 performs processes related to detection of corresponding points between projected and captured images. The attitude estimation section 154 performs processes related to attitude estimation of each of the projection/capture apparatuses 102 (or the projection section 111 and the capture section 112 of each of the projection/capture apparatuses 102). The setup section 155 performs processes related to specification of parameters regarding geometric corrections and so on. The projection control section 156 performs processes related to control over each of the projection sections 111. The capture control section 157 performs processes related to control over each of the capture sections 112.

It should be noted that the respective blocks are capable of exchanging information (e.g., instructions and data) with each other as necessary.

<Pattern Image Projection/Capture Section>

Figure 14:
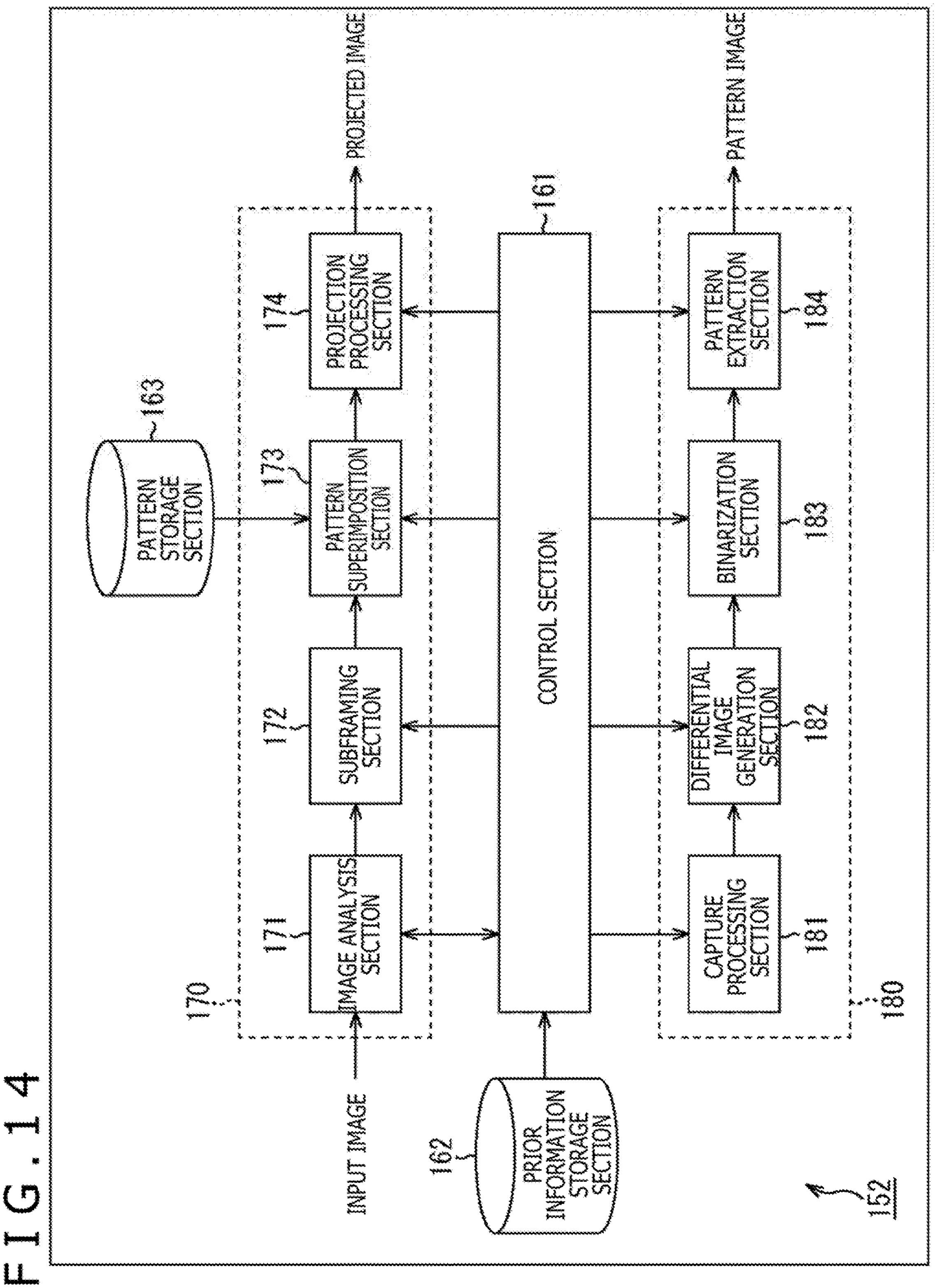
FIG. 14 is a functional block diagram illustrating examples of functions realized by a pattern image projection/capture section.

The pattern image projection/capture section 152 in FIG. 13 has functions illustrated as functional blocks in FIG. 14. That is, the pattern image projection/capture section 152 includes, for example, a control section 161, a prior information storage section 162, and a pattern storage section 163.

The control section 161 performs control related to projection and capture of a pattern image. The prior information storage section 162 stores information made available in advance (prior information) such as calibration information. This prior information is read and used by the control section 161 as appropriate. The pattern storage section 163 stores a pattern image. This pattern image is read and used as appropriate. It should be noted that the pattern storage section 163 may store a pattern image as positive and negative images (i.e., a pair of pattern images).

Also, for example, the pattern image projection/capture section 152 includes a pattern image projection section 170 and a pattern image capture section 180.

The pattern image projection section 170 performs processes related to projection of a pattern image. The pattern image projection section 170 includes an image analysis section 171, a subframing section 172, a pattern superimposition section 173, and a projection processing section 174.

The image analysis section 171 is supplied with an input image. This input image is an image to be projected and is, for example, a frame image of a content video. The image analysis section 171 analyzes this input image and returns an analysis result to the control section 11 under control of the control section 161. Also, the image analysis section 171 supplies the input image to the subframing section 172.

The subframing section 172 transforms the input image (frame image) into a plurality of subframes under control of the control section 161. For example, the control section 161 controls the manner in which the input image is transformed into subframes in accordance with the analysis result of the image analysis section 171. The subframing section 172 supplies each of the acquired subframes to the pattern superimposition section 173.

The pattern superimposition section 173 reads a pattern image from the pattern storage section 163 and superimposes the pattern image on a given subframe image under control of the control section 161. For example, the control section 161 controls whether or not to superimpose the pattern image on that frame in accordance with an analysis result of the image analysis section 171. Also, for example, the control section 161 controls, of the plurality of pattern images stored in the pattern image storage section 163, which pattern image to superimpose in accordance with an analysis result of the image analysis section 171. Further, for example, the control section 161 controls on which subframe image a pattern image is to be superimposed in accordance with an analysis result of the image analysis section 171. The pattern superimposition section 173 supplies each subframe image to the projection processing section 174.

The projection processing section 174 performs, as appropriate, geometric corrections on each of the supplied subframe images, supplies the subframe images to the projection section 111 of the projection/capture apparatus 102, and causes the images to be projected sequentially under control of the control section 161. For example, the control section 161 controls geometric corrections in accordance with an analysis result of the image analysis section 171, prior information read from the prior information storage section 162, and so on.

The pattern image capture section 180 performs processes related to capture of a pattern image. The pattern image capture section 180 includes a capture processing section 181, a differential image generation section 182, a binarization section 183, and a pattern extraction section 184.

The capture processing section 181 causes the capture section 112 of the projection/capture apparatus 102 to capture projected images and acquires captured images under control of the control section 161. The control section 161 drives the capture processing section 181 in synchronism with the projection processing section 174. The control section 161 ensures that the projection timing of each subframe image matches the capture timing thereof, performing control such that a projected image of a desired subframe (i.e., projected image including a pattern image) is captured. The capture processing section 181 supplies the captured image, acquired by the image capture, to the differential image generation section 182. This captured image includes a projected subframe image on which a pattern image has been superimposed.

The differential image generation section 182 generates a differential image of the captured image including the pattern image under control of the control section 161. That is, the differential image generation section 182 generates a differential image between a captured image including a projected subframe image on which a positive image has been superimposed and a captured image including a projected subframe image on which a negative image has been superimposed. The differential image generation section 182 supplies the differential image to the binarization section 183.

The binarization section 183 binarizes the differential image under control of the control section 161. The binarization section 183 supplies a binarized image, a binarized differential image, to the pattern extraction section 184.

The pattern extraction section 184 extracts the pattern image from the binarized image under control of the control section 161. The extracted pattern image is used for corresponding point detection performed by the corresponding point detection section 153.

Of course, the pattern image projection/capture section 152 may have functions other than these. It should be noted that the respective blocks are capable of exchanging information (e.g., instructions and data) with each other as necessary in addition to the relationships depicted by arrows in FIG. 14.

<Projection/Capture Apparatus>

Figure 15:
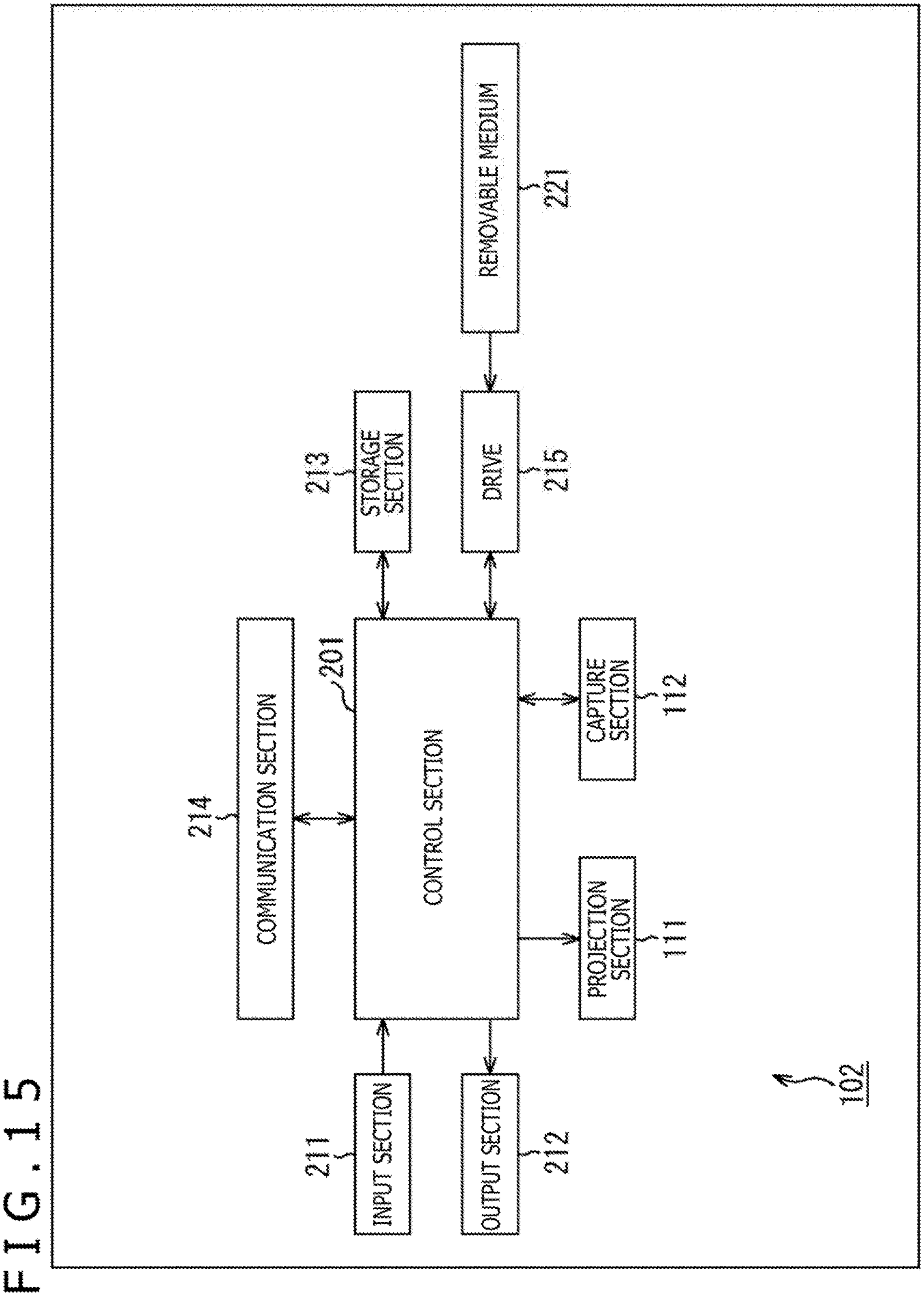
FIG. 15 is a block diagram illustrating an example of a main configuration of a projection/capture apparatus.

FIG. 15 is a block diagram illustrating an example of a main configuration of the projection/capture apparatus 102. As illustrated in FIG. 15, the projection/capture apparatus 102 includes a control section 201, the projection section 111, the capture section 112, an input section 211, an output section 212, a storage section 213, a communication section 214, and a drive 215.

The control section 201 includes, for example, a CPU, a ROM, a RAM, and so on, controls each processing section of the apparatus, and performs various processes required for such control. The control section 201 performs these processes, for example, on the basis of control performed by the control apparatus 101. For example, the control section 201 acquires an image supplied from the control apparatus 101 via the communication section 214 and supplies the image to the projection section 111 for projection under control of the control apparatus 101. Also, for example, the control section 201 causes the capture section 112 to capture the projection plane, acquires a captured image, and supplies the captured image to the control apparatus 101 via the communication section 214 under control of the control apparatus 101.

The projection section 111 performs processes related to image projection under control of the control section 201. For example, the projection section 111 projects an image supplied from the control section 201 outside (e.g., onto a projection plane) the projection/capture apparatus 102. The projection section 111 is, for example, an LCOS-based single-panel device, transforming each frame image of a video into subframes for each color component and sequentially projecting subframe images for each color component (performing color sequential driving). It should be noted that the projection section 111 may be a device of any kind as long as it can transform each frame of a video into subframes and sequentially project images of each color component.

The capture section 112 captures a subject outside the apparatus (e.g., projection plane), generates a captured image, and supplies the captured image to the control section 201 under control of the control section 201. The capture section 112 has, for example, an image sensor using a CMOS (Complementary Metal Oxide Semiconductor), an image sensor using a CCD (Charge Coupled Device), or other type of image sensor, converting light from the subject into electric charge using the image sensor and generating an electric signal (data) of the captured image. For example, the capture section 112 is driven in synchronism with the projection section 111 and captures a projected subframe image, projected onto the projection plane by the projection section 111, on which a pattern image has been superimposed. It should be noted that the capture section 112 may be a device of any kind as long as it can capture a projected image.

The input section 211 includes, for example, an input device that accepts arbitrary external information such as user input. This input device may be a device of any kind. For example, the input device may be an operating button, a touch panel, a camera, a microphone, an input terminal, or one of a variety of sensors such as acceleration sensor, optical sensor, or temperature sensor. The output section 212 includes, for example, an output device that outputs arbitrary information inside the apparatus such as image or voice. This output device may be a device of any kind. For example, the output device may be a display, a speaker, output terminal, or other device.

The storage section 213 includes a storage medium that stores programs, data, and so on. This storage medium may be a medium of any kind. For example, the storage medium may be a hard disk, a RAM disk, a non-volatile memory, or other medium.

The communication section 214 includes a communication device that engages in communication for exchanging information such as programs and data with external apparatuses via a given communication medium (e.g., arbitrary network such as the Internet). This communication device may be a device of any kind. For example, the communication device may be a network interface. For example, the communication section 214 is connected to the communication cable 103 and may be capable of communication with the control apparatus 101 connected via the communication cable 103. The communication section 214 may use an arbitrary communication method and an arbitrary communication standard for communication. For example, the communication section 214 may be capable of wired communication, wireless communication, or both thereof.

The drive 215 performs processes related to reading and writing information (e.g., programs and data) from and to a removable medium 221 inserted in itself. The removable medium 221 may be a recording medium of any kind. For example, the removable medium 221 may be a magnetic disk, an optical disc, a magneto-optical disk, a semiconductor memory, or other medium. For example, the drive 215 reads information (e.g., programs and data) stored in the removable medium 221 that is inserted in itself and supplies the information to the control section 201 or other section. Also, for example, the drive 215 acquires information (e.g., programs and data) supplied from the control section 201 or other section and writes the information to the removable medium 221 inserted in itself.

<Flow of the Setup Process>

A description will be given next of the processes performed by the projection/capture system 100 thus configured. As described above, the control apparatus 101 of the projection/capture system 100 projects content (video) by controlling each of the projection/capture apparatuses 102.

For example, the projection processing section 151 of the control apparatus 101 generates an image to be supplied to each of the projection/capture apparatuses 102 (projection section 111) from each of the frame images of the content (video). For example, the projection processing section 151 generates an image to be supplied to each of the projection/capture apparatuses 102 (projection section 111) by dividing a frame image of the content (video), performing an arbitrary geometric correction such as deformation, enlargement, reduction, or movement using parameters specified as will be described later by the setup section 155, or transforming a frame image into subframes. The projection processing section 151 supplies each of the generated subframe images to the projection/capture apparatus 102 (projection section 111) for projection.

At a given timing during that projection or on the basis of occurrence of a given event such as reception of an instruction, the control apparatus 101 redoes setups for geometric corrections, that is, specifies parameters regarding geometric corrections again. The control apparatus 101 specifies parameters for geometric corrections while at the same time projecting content (video) through online sensing based on the ISL scheme.

When the parameters regarding geometric corrections are thus updated during image projection, the control apparatus 101 projects subsequent images after geometrically correcting the images on the basis of the updated parameters.

An example of a setup process performed by the control apparatus 101 for such specification of parameters for geometric corrections will be described with reference to the flowchart illustrated in FIG. 16.

When the setup process is initiated, the pattern image projection/capture section 152 of the control apparatus 101 and other sections project and capture a pattern image and extract, for each captured image acquired by capturing each of projected images by each of the capture sections 112 projected by the respective projection sections 111, the pattern image included in the captured image by controlling each of the projection/capture apparatuses 102 in step S101. Details will be described later.

In step S102, the corresponding point detection section 153 detects corresponding points between the projected and captured images by using the pattern image extracted from each of the captured images in step S101.

In step S103, the attitude estimation section 154 estimates the attitudes of each of the projection sections 111 and each of the capture sections 112 (or the attitude of each of the projection/capture apparatuses 102) and reconfigures a screen (projection plane) by using the corresponding points detected in step S102. Reconfiguration of a screen is a process of specifying the shape of a screen, a projection plane.

In step S104, the setup section 155 specifies parameters regarding geometric corrections for the image to be projected from each of the projection sections 111 as necessary on the basis of results of the attitude estimation and screen reconfiguration processes performed in step S103.

When the process in step S104 ends, the setup process ends.

The projection processing section 151 and the projection processing section 174 perform geometric corrections on subframe images using parameters regarding geometric corrections thus specified.

<Flow of the Pattern Image Projection/Capture Process>

A description will be given next of an example of a flow of the pattern image projection/capture process performed in step S101 of FIG. 16 with reference to the flowcharts illustrated in FIGS. 17 and 18.

When the pattern image projection/capture process is initiated, the projection control section 156 selects, in step S121, a projection section to perform the process (target projection section) from among the projection sections 111 that have yet to perform the process.

In step S122, the image analysis section 171 selects a target frame to be processed from among content video frames that have yet to be processed and analyzes the image of the target frame (also referred to as an input image).

In step S123, the subframing section 172 transforms the input image into subframes.

In step S124, the control section 161 selects a subframe image to be processed (target subframe image) from among subframe images that have yet to be processed.

In step S125, the pattern superimposition section 173 determines whether or not to superimpose a pattern image on the target subframe image. In the case where it is determined that the pattern image will be superimposed, the process proceeds to step S126.

In step S126, the pattern superimposition section 173 superimposes a pattern image read from the pattern storage section 163 on the target subframe image to be projected by the target projection section.

In step S127, the projection processing section 174 supplies, to the target projection section, the target subframe image on which the pattern image was superimposed in step S126 and causes the image to be projected. At that time, the projection processing section 174 performs geometric corrections on the target subframe image as appropriate.

In step S128, the capture control section 157 selects a capture section to perform the process (target capture section) from among the capture sections 112 that have yet to perform the process.

In step S129, the capture processing section 181 causes the target capture section to capture a projected image at a timing that matches the projection timing of the target subframe image in step S127. That is, the capture processing section 181 causes the target capture section to capture a projected image projected in step S127 (target subframe image), thereby acquiring a captured image including at least part of the projected image.

In step S130, the capture control section 157 determines whether or not all the capture sections 112 have captured images. In the case where it is determined that there are one or more capture sections 112 that have yet to perform the process, the process returns to step S128. Also, in the case where it is determined in step S128 that all the capture sections 112 have captured an image, the process proceeds to FIG. 18.

That is, each of the processes from step S128 to step S130 is performed by each of the capture sections 112. It should be noted that these processes may be omitted for the capture section 112 whose capture range does not include a projected image of the target subframe image.

Figure 17:
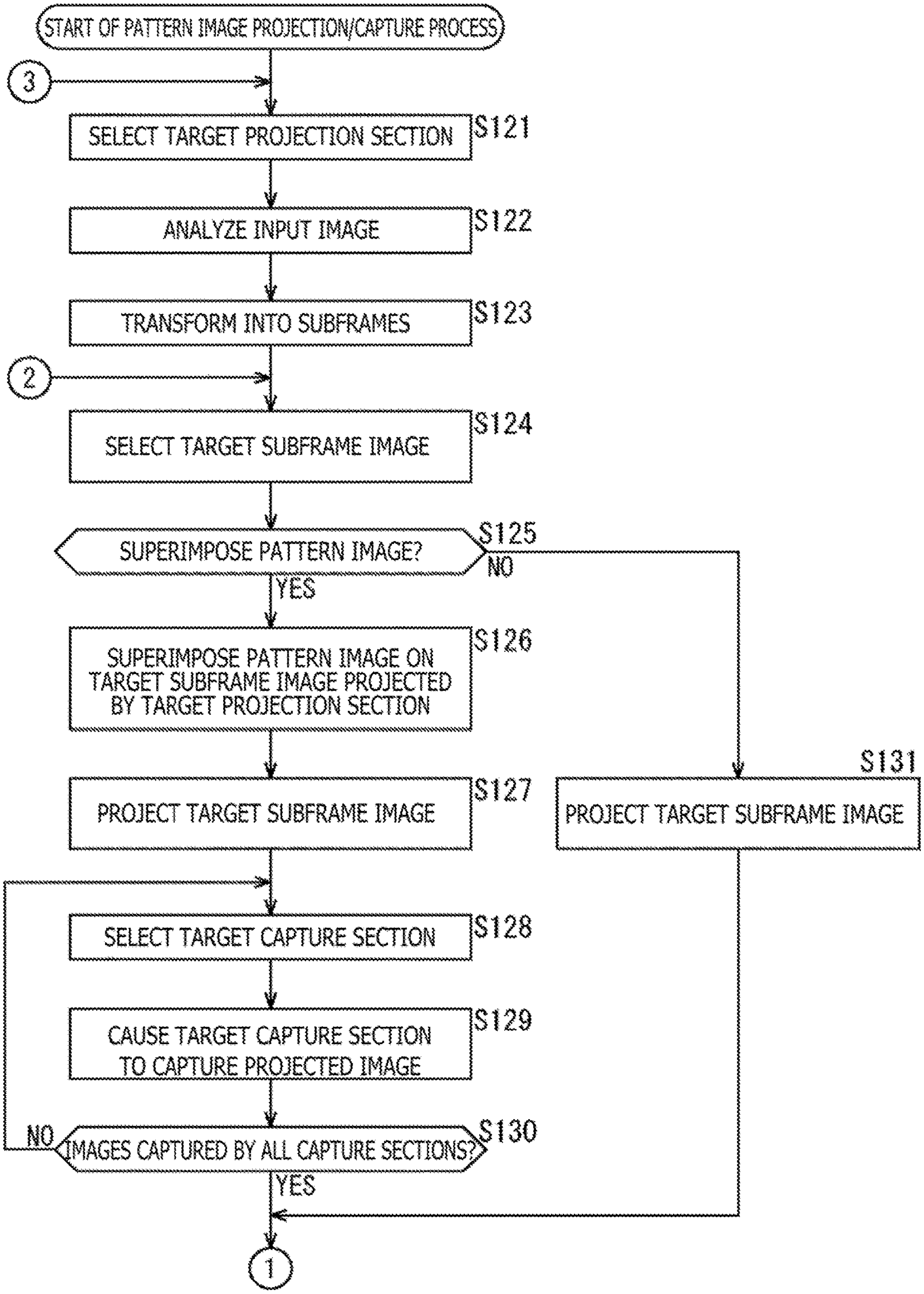
FIG. 17 is a flowchart describing an example of a flow of a pattern image projection/capture process.

Also, in the case where it is determined in step S125 of FIG. 17 that the pattern image will not be superimposed on the target subframe image, the process proceeds to step S131.

In step S131, the projection processing section 174 supplies the target subframe image to the target projection section for projection. At that time, the projection processing section 174 performs geometric corrections on the target subframe image as appropriate. It should be noted that the pattern image is not superimposed on this target subframe image. When the target subframe image is projected, the process proceeds to FIG. 18.

Figure 18:
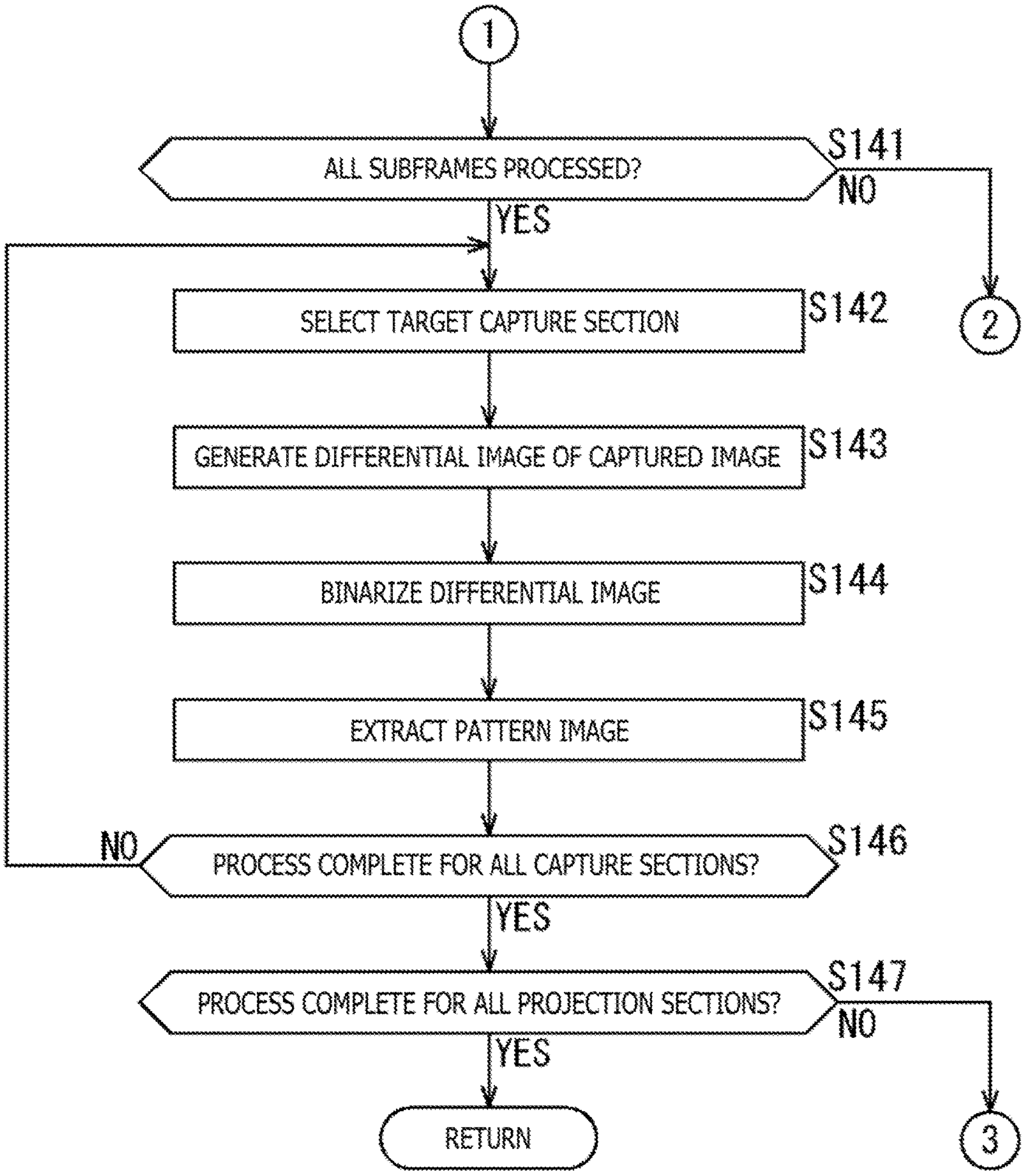
FIG. 18 is a flowchart continued from FIG. 17 describing an example of a flow of the pattern image projection/capture process.

When the target subframe image on which the pattern image has been superimposed is projected followed by capture by all the capture sections 112, or when the target subframe image on which no pattern image has been superimposed is projected, the control section 161 determines in step S141 in FIG. 18 whether or not all the subframes corresponding to the target frame have been processed. In the case where it is determined that there are one or more subframes that have yet to be processed, the process returns to step S124 in FIG. 17. Also, in the case where it is determined in step S141 in FIG. 18 that all the subframes have been processed, the process proceeds to step S142. That is, each of the processes from step S124 to step S131 in FIG. 17 and the process in step S141 in FIG. 18 are performed for each of the subframes corresponding to the target frame.

When the projection ends for all the subframes corresponding to the target frame, the control section 161 selects, in step S142, a capture section to perform the process (target capture section) from among the capture sections 112 that have yet to perform the process.

In step S143, the differential image generation section 182 generates a differential image between captured images acquired by capture by the target capture section selected in step S142. That is, the differential image generation section 182 generates a differential image between a captured image including the positive image of the pattern image and a captured image including the negative image of the pattern image.

In step S144, the binarization section 183 generates a binarized image by binarizing the differential image generated in step S143.

In step S145, the pattern extraction section 184 extracts (part or whole of) the pattern image included in the binarized image generated in step S144.

In step S146, the control section 161 determines whether or not these processes have been performed for all the capture sections 112. In the case where it is determined that there are one or more capture sections 112 that have yet to perform the process, the process returns to step S142. Also, in the case where it is determined, in step S146 that these processes have been performed for all the capture sections 112, the process proceeds to step S147.

That is, each of the processes from step S142 to step S146 is performed for each of the capture sections 112. It should be noted that these processes may be omitted for the capture section 112 that did not capture any image in step S129 in FIG. 17 (the capture section 112 for which there is no captured image).

When the projected image projected by the target projection section is captured by all the capture sections 112 followed by extraction of a pattern image for each of the acquired captured images, the projection control section 156 determines, in step S147, whether or not all the projection sections 111 have performed the process. In the case where it is determined that there are one or more projection sections 111 that have yet to perform the process, the process returns to step S121 in FIG. 17. That is, each of the processes from step S121 in FIG. 17 to step S147 in FIG. 18 is performed for each of the projection sections 111.

Figure 16:
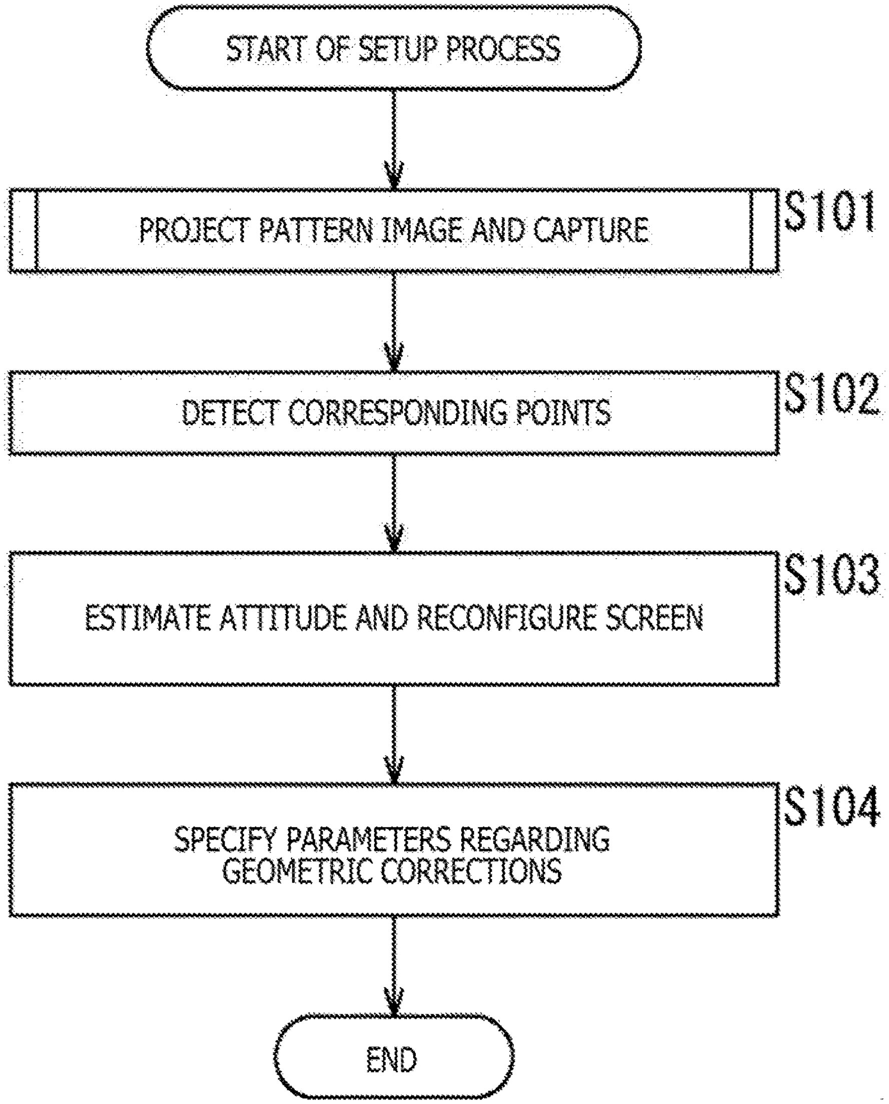
FIG. 16 is a flowchart describing an example of a flow of a setup process.

Then, in the case where it is determined in step S147 in FIG. 18 that all the projection sections 111 have projected pattern images, that is, projected images projected by all the projection sections 111 have been captured by all the capture sections 112 and a pattern image has been extracted for each of the acquired captured images, the pattern image projection/capture process ends, and the process returns to FIG. 16.

As described above, corresponding point detection is performed by using a pattern image extracted from each captured image.

Thus, by performing each of the processes, it is possible to realize online sensing based on the ISL scheme using a color-sequential-driven single-panel device, thereby realizing corresponding point detection during content viewing while at the same time keeping cost increase to a minimum.

<Pattern Image>

It should be noted that a pattern image to be superimposed on a video may be a pattern (design) of any kind. A pattern that is highly invisible and easier to detect is preferred. A pattern image may not be a pair of pattern images (that is, positive and negative images) whose directions of luminance change in the pattern are opposite. For example, a pattern image with low invisibility (i.e., only a positive image) may be superimposed on a video. In that case, it is only necessary to superimpose the pattern image on some of a plurality of subframe images corresponding to one frame. It is possible to extract the pattern image by finding the difference between the subframe image on which the pattern image has been superimposed and the subframe image on which the pattern image has not been superimposed. That is, in this case, it is also possible to find corresponding points basically in a similar manner to that for the above superimposition of a pair of pattern images.

<Subframes>

Also, although it has been described above that each of red, green, and blue components of a frame image is transformed into a subframe during transformation into subframes, color components to be transformed into subframes are arbitrary. For example, color components may be cyan, magenta, yellow, and so on. Also, the number of colors is arbitrary, two or less colors or four or more colors may be used. For example, bluish green may be used in addition to red, green, and blue. Alternatively, white and yellow may be included. Also, band components outside the visible range such as near infrared, infrared, and ultraviolet light may be included.

<Immediately Previous Subframe>

In the case where a plurality of images having different color components are projected in succession as subframes, an afterimage actually occurs due, for example, to display device response. This leads to a possibility that even if capture is performed in synchronism with a subframe, a projected image of a subframe projected immediately before the captured image may be included. For example, in the case where a red component subframe is projected immediately before a green component subframe on which a positive image has been superimposed, and a blue component subframe is projected immediately before a green component subframe on which a negative image has been superimposed, there is a possibility that not only a pattern image but also red and blue component images may remain in the differential image between the green component subframe image on which the positive image has been superimposed and the green component subframe image on which the negative image has been superimposed, possibly making it difficult to extract the pattern image with sufficiently high accuracy.

For this reason, a frame may be transformed into subframes such that subframe images projected immediately before subframes on which a pair of pattern images are superimposed have the same color component (such that subframe images are projected in such an order). This makes it less likely for a frame image to remain in a differential image than in the case where a subframe immediately before a subframe on which a positive image is superimposed and a subframe immediately before a subframe on which a negative image is superimposed have different color components (that is, this ensures reduced amount of frame image remaining in a differential image).

<Filter>

Also, a filter that passes only the subframe color component superimposed on the pattern image may be provided in the capture section 112 so that a captured image is acquired by capturing a projected image via the filter. This ensures reduced undesired color components in the captured image. It is possible to make it less likely for the immediately previous subframe image to be included in the captured image as an afterimage component (that is, it is possible to reduce the amount of the immediately previous subframe image included in the captured image).

<Calibration>

Also, remaining components of the captured image or differential image may be reduced through calibration by performing calibration in advance. For example, the relationship between the mean value of each color component of the input image and the remaining component thereof may be found in advance, followed by estimation of the remaining component from the immediately previous subframe image on the basis of the relationship and removal of the remaining component from the captured image or the differential image.

3. Second Embodiment

<Sensing Operation Mode>

Incidentally, the order of subframes of different color components is required to be more random in order to further reduce color breaking. Also, it is desirable to switch between different color components quickly.

In the case of the example illustrated in FIG. 10, not only has the projection order of color components regularity, but the switching rate between color components is half the subframe rate. Such projection of content (video) as a whole is highly likely to result in color breaking, possibly leading to reduced subjective image quality for viewing users. In contrast, the order at the top in FIG. 19 (general operation mode) depicts a more complicated (random) arrangement of images of different colors than in the example in FIG. 10. In addition, different color components are switched more frequently. As a result, it is possible to keep color breaking to a minimum.

However, a highly random projection order is likely unsuitable for extracting a pattern image as described above. For example, there is a possibility that frames projected immediately before subframes on which a pattern image is superimposed may not have the same color component and that subframes of a highly luminous color component may not be successive.

For this reason, frames not subject to corresponding point detection may be transformed into subframes as general operation mode such that color breaking is further reduced, whereas frames on which a pattern image is superimposed for corresponding point detection may be transformed into subframes such that it is possible to extract a pattern image with more accuracy. That is, the order of projecting subframes may be different between frames subject to corresponding point detection and frames not subject thereto.

This realizes corresponding point detection using single-panel image projection while keeping occurrence of color breaking to a minimum. That is, it is possible to realize corresponding point detection during content viewing while at the same time keeping reduction in subjective image quality and cost increase to a minimum.

Figure 19:
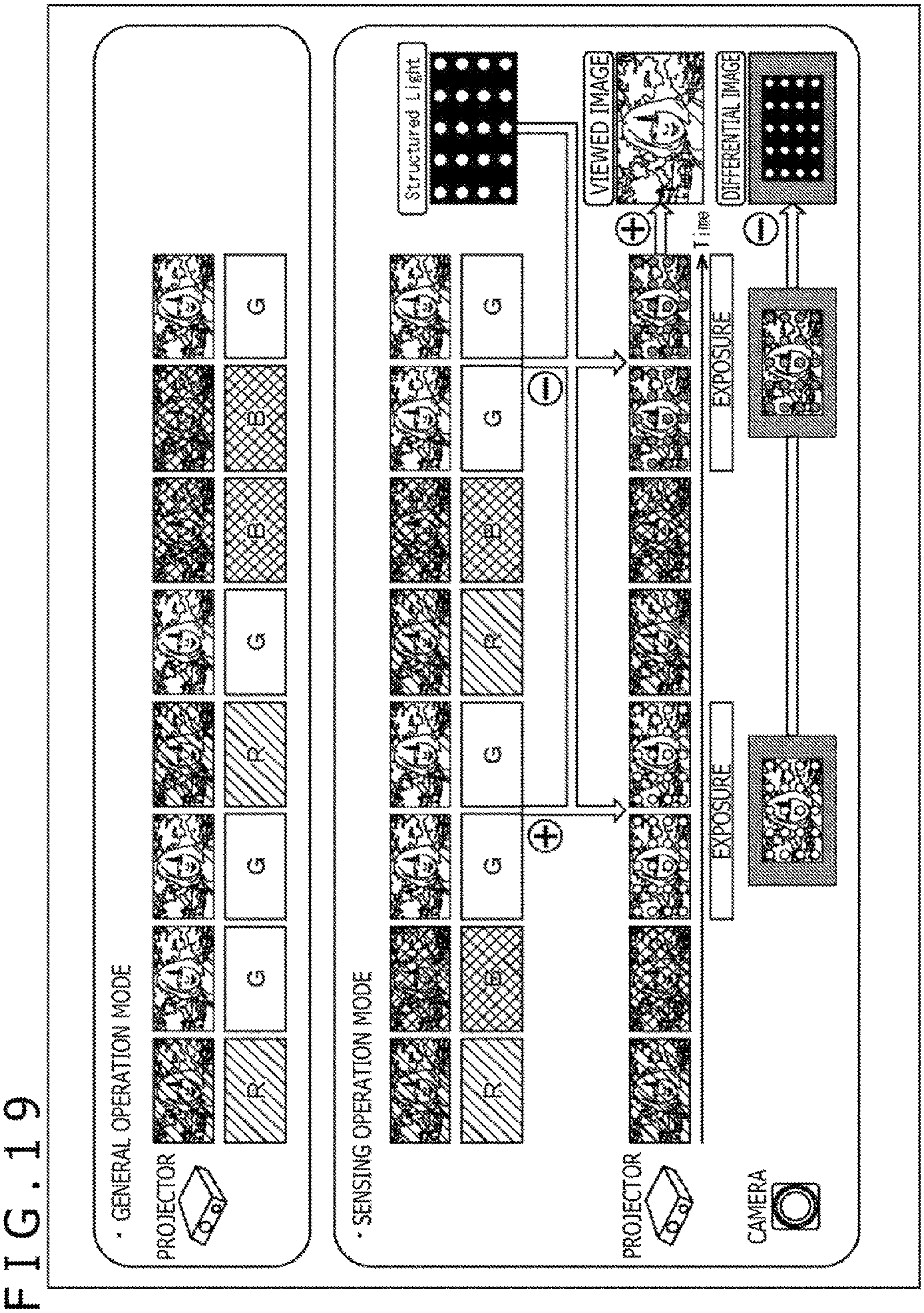
FIG. 19 is a diagram describing an example of switching between operation modes.

For example, in the case of FIG. 19, subframes are projected in the order of red, green, green, red, green, blue, blue, and green in general operation mode. In sensing operation mode, however, subframes are projected in the order of red, blue, green, green, red, blue, green, and green. That is, although the arrangement of subframes in sensing operation mode translates into lower randomness than in general operation mode, two each of the four green component subframes on which a pattern image is superimposed are successive.

Although the above corresponding point detection can be performed at an arbitrary timing (frame), it may not be performed at all times (for all the frames). In general, it is only necessary to perform corresponding point detection at very few frames. That is, it is possible to make color breaking unlikely even with reduced randomness in sensing operation mode, thereby keeping reduction in subjective image quality to a minimum.

Then, succession of green component subframes on which a pattern image is superimposed not only ensures a longer exposure time for capture but also contributes to slower camera driving than the subframe rate as described in the first embodiment.

Also, in the case of the example illustrated in FIG. 19, the subframes on which a positive image is superimposed are arranged at the third and fourth positions, and the subframes on which a negative image is superimposed are arranged at the seventh and eighth positions. That is, of the eight subframes, a group of subframes on which a positive image is superimposed and a group of subframes on which a negative image is superimposed are arranged in such a manner as to be more distributed. Therefore, exposure of two subframes is performed once before and once after a two-subframe blank period, thereby allowing more stable and uniform camera driving and keeping load on the camera to a minimum.

Further, in the case of FIG. 19, the subframe immediately before the two subframes on which a positive image is superimposed and the subframe immediately before the two subframes on which a negative image is superimposed are both blue components. Therefore, it is easier to keep the afterimage component remaining in the differential image to a minimum as described in the first embodiment.

Of course, the projection order of subframes in each of general operation mode and sensing operation mode is arbitrary and is not limited to the example illustrated in FIG. 19.

It should be noted that, also in this case, the projection/capture system 100 has a configuration basically similar to that of the first embodiment. The control apparatus 101 and the projection/capture apparatus 102 also have configurations basically similar to those of the first embodiment. The functional blocks that realize the control apparatus 101 also have configurations basically similar to those of the first embodiment.

<Flow of the Image Projection Process>

Figure 20:
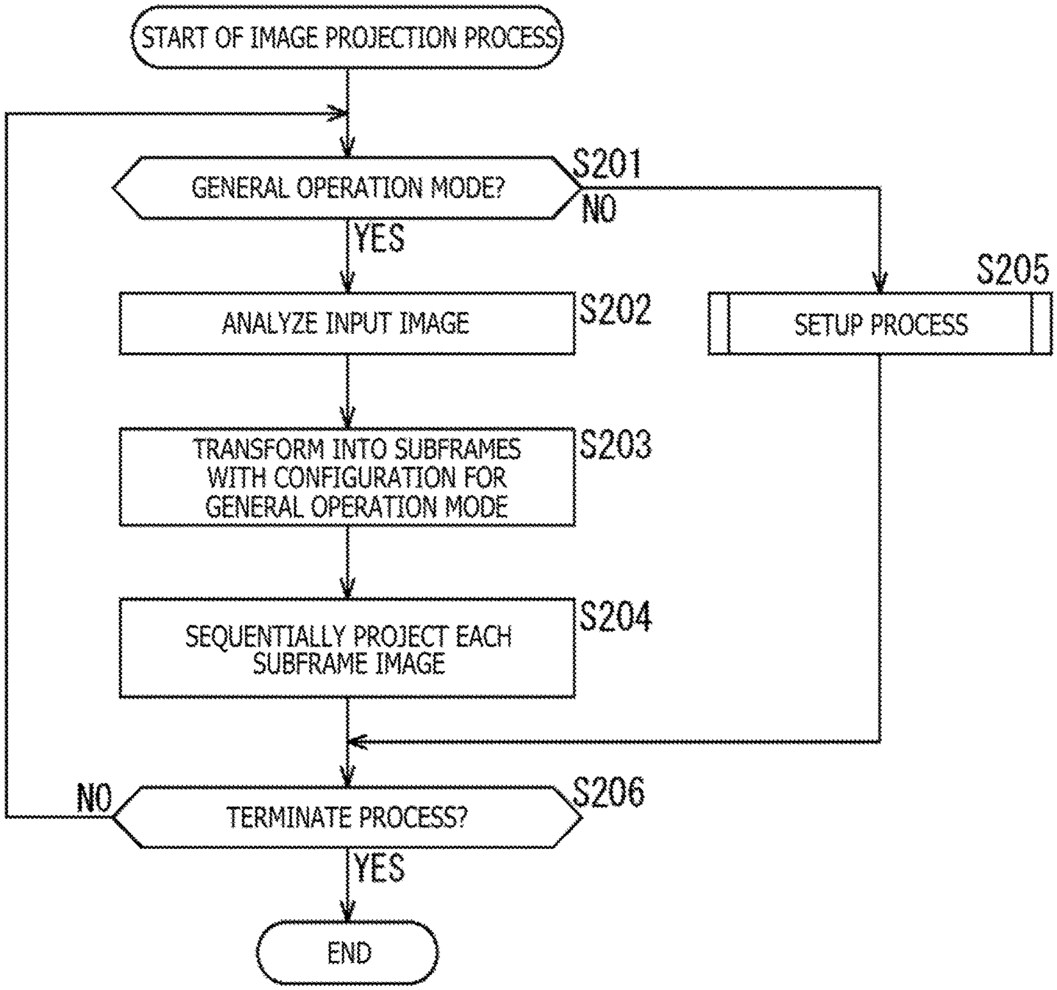
FIG. 20 is a flowchart describing an example of a flow of an image projection process.

A description will be given of an example of a flow of an image projection process performed by the control apparatus 101 for projecting content (video) in this case with reference to the flowchart illustrated in FIG. 20.

When the image projection process is initiated, the projection control section 156 of the control apparatus 101 determines in step S201 whether or not the operation mode is general operation mode. In the case where, in the target frame, only projection of content (video) will be performed and corresponding point detection will not be performed, the process proceeds to step S201.

In that case, the control apparatus 101 selects general operation mode as operation mode of the projection/capture system 100 and performs each of the processes from step S202 to step S204. That is, the projection processing section 151 analyzes the input image in step S201, transforms a target frame into a subframe configuration for general operation mode in step S202, and causes the projection section 111 to sequentially project each of the subframe images in step S203. The projection processing section 151 performs these processes for all the projection sections 111. That is, each of the projection sections 111 is caused to project an image for each of the projection sections 111. When the process in step S204 ends, the process proceeds to step S206.

Also, in the case where it is determined in step S201 that corresponding point detection will be performed in the target frame, the process proceeds to step S205. In this case, the control apparatus 101 selects sensing operation mode as operation mode of the projection/capture system 100 and performs the process in step S205. That is, the pattern image projection/capture section 152 through the capture control section 157 perform the setup process in step S205. This setup process is performed in accordance with a flow similar to that for the first embodiment described with reference to the flowchart illustrated in FIG. 16. It should be noted, however, that the flow of the pattern image projection/capture process conducted during the setup process will be described later. When the process in step S205 ends, the process proceeds to step S206.

In step S206, the projection processing section 151 determines whether or not to terminate the image projection process. In the case where it is determined that the video projection continues and the next frame will be projected without terminating the image projection process, the process returns to step S201. That is, the subsequent processes will be performed on the next frame as a target frame. In the case where it is determined in step S206 that the video projection will be terminated, the image projection process is terminated.

<Flow of the Pattern Image Projection/Capture Process>

As described above, the setup process in step S205 in FIG. 20 is performed in accordance with the flow as described with reference to the flowchart illustrated in FIG. 16.

A description will be given of an example of a flow of the pattern image projection/capture process performed in step S101 in FIG. 16 in this case with reference to the flowcharts illustrated in FIGS. 21 and 22. Also in this case, each process is basically performed in a manner similar to that described with reference to the flowcharts illustrated in FIGS. 17 and 18.

Figure 21:
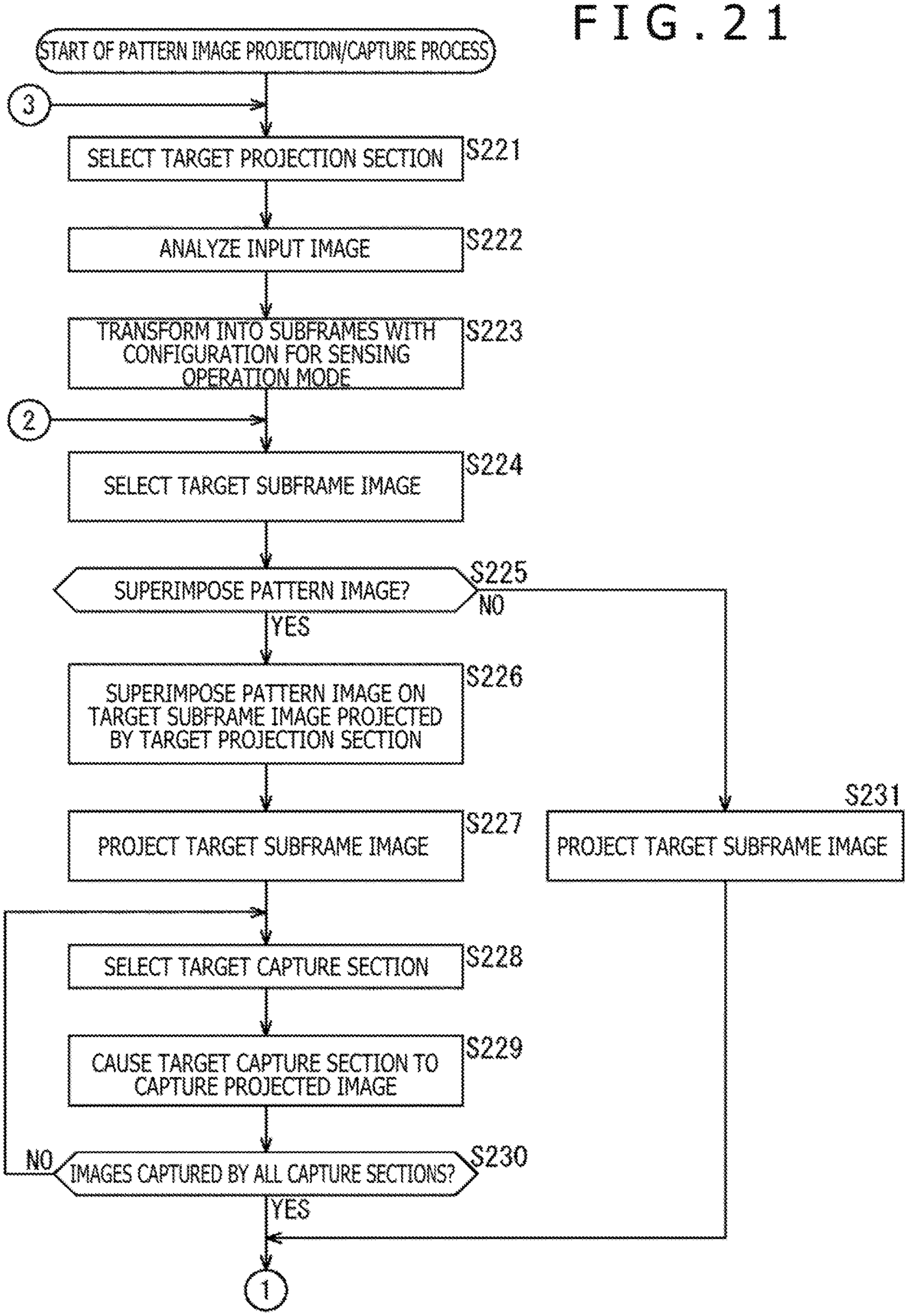
FIG. 21 is a flowchart describing an example of a flow of a pattern image projection/capture process.

The processes in steps S221 and S222 in FIG. 21 are performed in a manner similar to the processes in steps S121 and S122 (FIG. 17), respectively.

It should be noted, however, that the subframing section 172 transforms an input image into a subframe configuration for sensing operation mode in step S223.

The processes in steps S224 through S231 are performed in a manner similar to the processes in steps S124 through S131 (FIG. 17), respectively.

Figure 22:
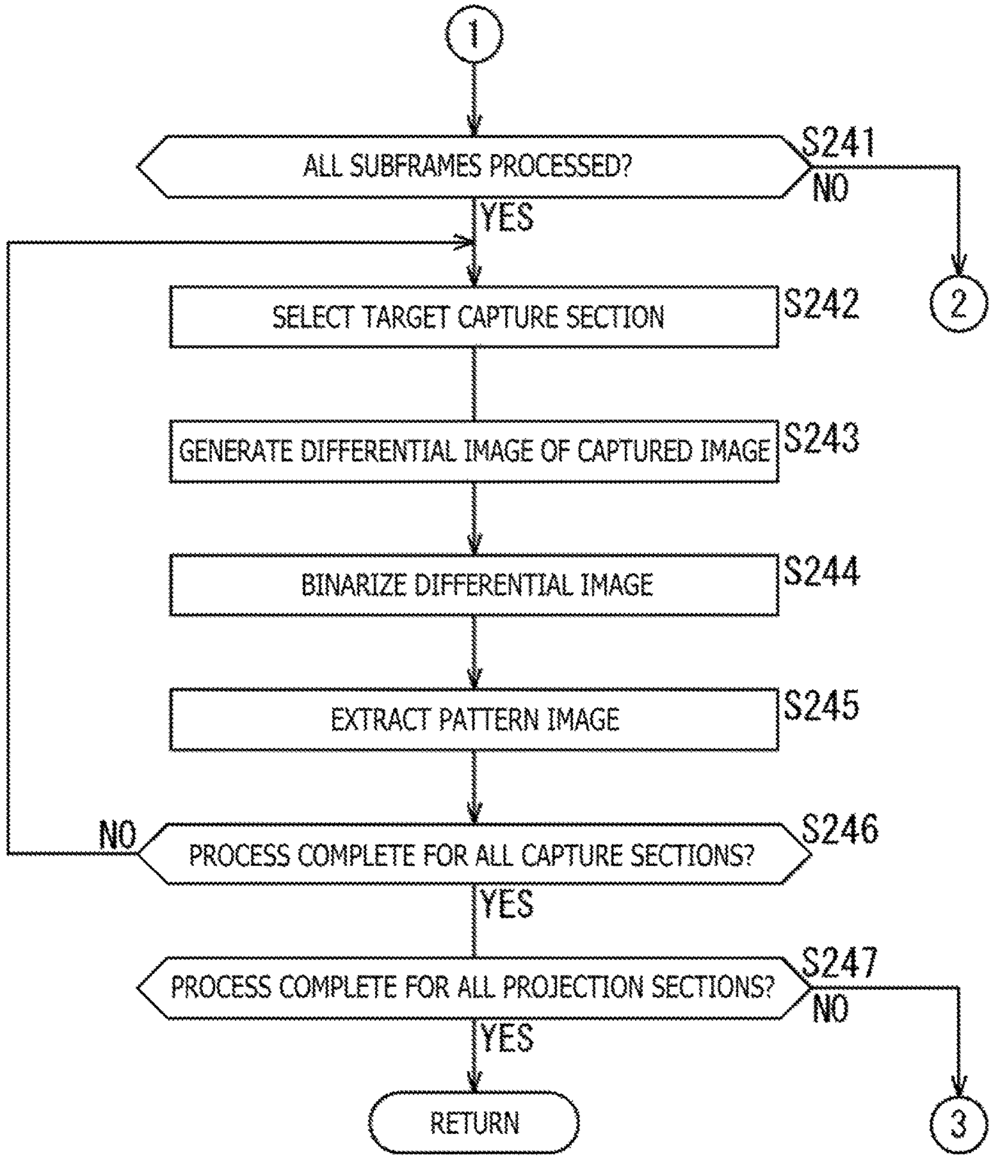
FIG. 22 is a flowchart continued from FIG. 21 describing an example of a flow of the pattern image projection/capture process.

The processes in steps S241 through S247 in FIG. 22 are performed in a manner similar to the processes in steps S141 through S147 (FIG. 18), respectively.

By performing each process as described above, it is possible to realize online sensing based on the ISL scheme using a color-sequential-driven single-panel device while at the same time keeping occurrence of color breaking to a minimum, thereby permitting corresponding point detection during content viewing while at the same time keeping cost increase to a minimum.

4. Third Embodiment

Other Configuration Examples of the Projection/Capture System and the Projection/Capture Apparatus It should be noted that configuration examples of the projection/capture system to which the present technology is applied are not limited to those described above. For example, the control apparatus 101 and each of the projection/capture apparatuses 102 may be connected to each other via a network 401 as in a projection/capture system 400 illustrated in A of FIG. 23.

The network 401 is an arbitrary communication network. The communication method adopted in the network 401 is arbitrary. For example, wired communication or wireless communication may be used, or both thereof may be used. Also, the network 401 may include a communication network or a plurality of communication networks. For example, communication networks and communication channels compliant with arbitrary communication standards may be included in the network 401. Such communication networks and communication channels include the Internet, public telephone network, wireless mobile wide area communication networks such as so-called 3G and 4G networks, wireless communication networks handling communication compliant with WAN (Wide Area Network), LAN (Local Area Network), and Bluetooth (registered trademark) standards, short range wireless communication channels such as NFC (Near Field Communication), infrared communication channel, and wired communication networks compliant with HDMI (registered trademark) (High-Definition Multimedia Interface), USB (Universal Serial Bus), other standards.

The control apparatus 101 and each of the projection/capture apparatuses 102 are connected to the network 401 in a manner that permits communication. It should be noted that this connection may be wired (i.e., connection via wired communication), wireless (i.e., connection via wireless communication), or both thereof. It should be noted that the number of apparatuses, the shapes and sizes of housings, the positions where they are provided, and so on are arbitrary.

The control apparatus 101 and each of the projection/capture apparatuses 102 can communicate with each other (exchange information with each other) via the network 401. In other words, the control apparatus 101 and each of the projection/capture apparatuses 102 may be connected to each other via other facility (e.g., apparatus or transport path).

The present technology is also applicable in the case of the projection/capture system 400 thus configured in a manner similar to the projection/capture system 100, and the operational advantage described above can be achieved.

Figure 23:
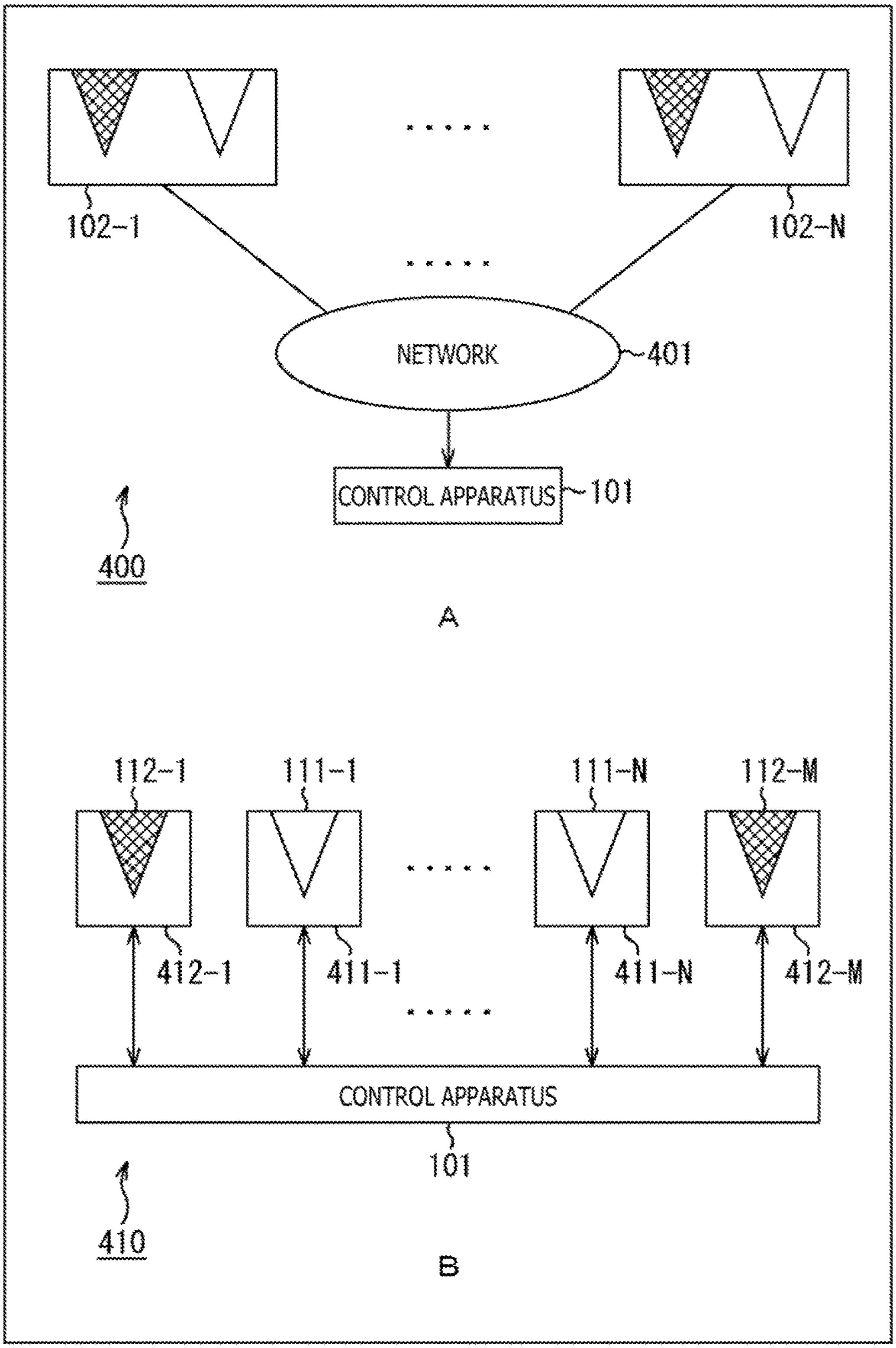
FIG. 23 depicts block diagrams illustrating another configuration example of the projection/capture system.

Also, for example, the projection section 111 and the capture section 112 may be configured as different apparatuses as in a projection/capture system 410 illustrated in B of FIG. 23. The projection/capture system 410 includes projection apparatuses 411-1 to 411-N (where N is an arbitrary natural number) and capture apparatuses 412-1 to 412-M (where M is an arbitrary natural number) rather than the projection/capture apparatuses 102. The projection apparatuses 411-1 to 411-N include the projection sections 111 (projection sections 111-1 to 111-N), respectively, to project images. The capture apparatuses 412-1 to 412-M include the capture sections 112 (capture sections 112-1 to 112-M), respectively, to capture images of projection planes (projected images projected by the projection sections 111).

In the case where there is no need to distinguish between the projection apparatuses 411-1 to 411-N for description, they will be referred to as the projection apparatuses 411. In the case where there is no need to distinguish between the capture apparatuses 412-1 to 412-M for description, they will be referred to as the capture apparatuses 412.

Each of the projection apparatuses 411 and each of the capture apparatuses 412 are connected to the control apparatus 101 in a manner that permits communication and can communicate with the control apparatus 101 through wired communication, wireless communication, or both thereof (can exchange information). It should be noted that each of the projection apparatuses 411 and each of the capture apparatuses 412 may be able to communicate with other projection apparatus 411, other capture apparatus 412, or both thereof.

Also, the number of apparatuses, the shapes and sizes of housings, the positions where they are provided, and so on are arbitrary. Also, the apparatuses may be connected to each other via other facility (apparatus or transport path) such as the network 401 as in the example illustrated in A of FIG. 23.

The present technology is also applicable in the case of the projection/capture system 410 thus configured in a manner similar to the projection/capture system 100, and the operational advantage described above can be achieved.

Figure 24:
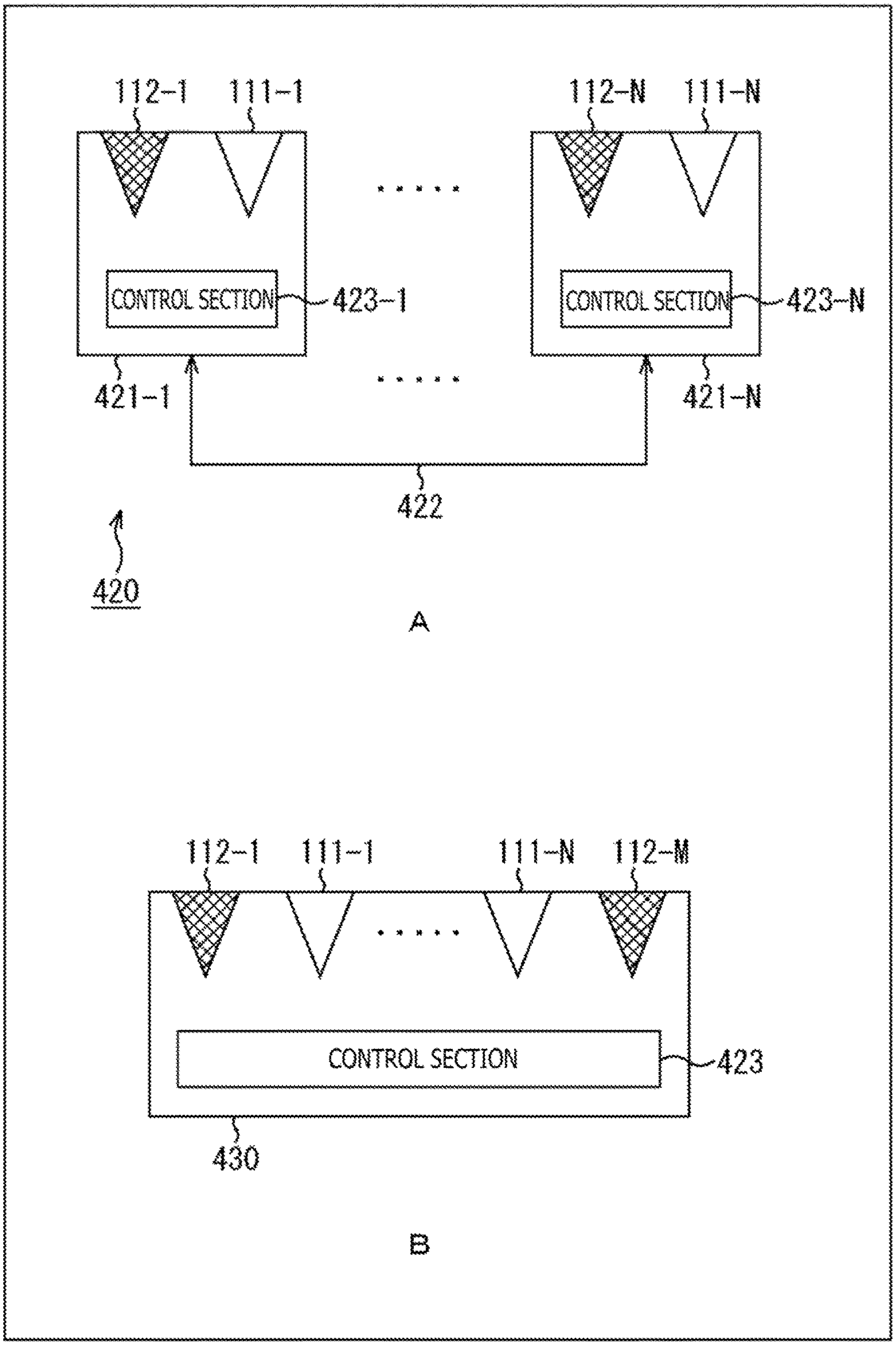
FIG. 24 depicts block diagrams illustrating an example of a main configuration of the projection/capture system and the projection/capture apparatus.

Also, for example, the control apparatus 101 may be omitted as in a projection/capture system 420 illustrated in A of FIG. 24. As illustrated in A of FIG. 24, the projection/capture system 420 includes projection/capture apparatuses 421-1 to 421-N (where N is an arbitrary natural number). In the case where there is no need to distinguish between the projection/capture apparatuses 421-1 to 421-N for description, they will be referred to as the projection/capture apparatuses 421. The projection/capture apparatuses 421 are connected to each other via a communication cable 422 in a manner that permits communication. It should be noted that the projection apparatuses 421 may be connected to each other through wireless communication in a manner that permits communication.

The projection/capture apparatuses 421-1 to 421-N include control sections 423-1 to 423-N, respectively. In the case where there is no need to distinguish between the control sections 423-1 to 423-N for description, they will be referred to as the control sections 423. The control sections 423 have functions similar to and can perform processes similar to those of the control apparatus 101.

That is, in the case of the projection/capture system 420, the processes performed by the control apparatus 101 described above are performed by the projection/capture apparatuses 421 (control sections 423 thereof). It should be noted that all the processes performed by the control apparatus 101 may be performed by any one of the projection/capture apparatuses 421 (control section 423 thereof) or by the plurality of the projection/capture apparatuses 421 (control sections 423 thereof) in a coordinated manner, for example, by exchanging information with each other.

The present technology is also applicable in the case of the projection/capture system 420 thus configured in a manner similar to the projection/capture system 100, and the operational advantage described above can be achieved.

Also, for example, the projection/capture system 100 may be configured as a single apparatus as illustrated in B of FIG. 24. A projection/capture apparatus 430 illustrated in B of FIG. 24 includes the projection sections 111 (projection sections 111-1 to 111-N (where N is an arbitrary natural number)), the capture sections 112 (capture sections 112-1 to 112-M (where M is an arbitrary natural number)), and a control section 423.

In the projection/capture apparatus 430, the control section 423 performs the processes handled by the control apparatus 101 described above, thereby controlling each of the projection sections 111 and each of the capture sections 112 and performing corresponding point detection and other tasks.

Therefore, the present technology is also applicable in the case of the projection/capture apparatus 430 thus configured in a manner similar to the projection/capture system 100, and the operational advantage described above can be achieved.

5. Others

Application Example of the Present Technology

The systems and apparatuses according to the embodiments described above are applicable to an arbitrary system or electronic equipment. Also, the present technology is applicable to image processing systems and image processing apparatuses in arbitrary fields such as traffic, medical care, crime prevention, agriculture, livestock raising, mining, beauty business, factories, home electric appliances, meteorology, and natural surveillance.

For example, the present technology is applicable to a system for projecting and capturing images for appreciative use. Also, for example, the present technology is applicable to a system for traffic use. Further, for example, the present technology is applicable to a system for security use. Also, for example, the present technology is applicable to a system for sportive use. Further, for example, the present technology is applicable to a system for agricultural use. Also, for example, the present technology is applicable to a system for use in livestock raising. Further, for example, the present technology is applicable to a system for monitoring natural conditions such as volcanoes, forests, and oceans, to a meteorological observation system for monitoring weather, temperature, humidity, wind speed, and duration of sunlight, and to a system for observing ecology of wildlife such as birds, fish, reptiles, amphibians, mammals, insects, and plants.

<Software>

The series of processes described above may be performed by hardware or software. In the case where the series of processes are performed by software, the program included in the software is installed from a network or a recording medium.

In the case of the control apparatus 101 illustrated in FIG. 12, for example, this recording medium includes a removable medium 141 that is distributed separately from the main body of the apparatus to deliver the program to the user and in which the program is recorded. In that case, for example, it is possible to read the program recorded in the removable medium 141 and install it to the storage section 133 by inserting the removable medium 141 into the drive 135.

Also, in the case of the projection/capture apparatus 102 illustrated in FIG. 15, for example, this recording medium includes a removable medium 221 that is distributed separately from the main body of the apparatus to deliver the program to the user and in which the program is recorded. In that case, for example, it is possible to read the program recorded in the removable medium 221 and install it to the storage section 213 by inserting the removable medium 221 into the drive 215.

Also, this program can be provided via a wired or wireless transport medium such as local area network, the Internet, and digital satellite broadcasting. In the case of the control apparatus 101 illustrated in FIG. 12, for example, the program can be received by the communication section 134 and installed to the storage section 133. Also, in the case of the projection/capture apparatus 102 illustrated in FIG. 15, for example, the program can be received by the communication section 214 and installed to the storage section 213.

In addition to the above, the program can be installed in advance to the storage section, the ROM, or other section. In the case of the control apparatus 101 illustrated in FIG. 12, for example, the program can be installed in advance to the storage section 133, the ROM 122, or other section. Also, in the case of the projection/capture apparatus 102 illustrated in FIG. 15, for example, the program can be installed in advance to the storage section 213 or the ROM (not depicted) built into the control section 201.

It should be noted that the processes in the steps describing the program executed by a computer may be performed chronologically in accordance with the sequence explained in the present specification or performed in parallel or individually at a necessary timing as when the program is called. Further, the processes in the steps describing this program may be performed in parallel with processes of other program or in combination with processes of other program.

Also, the process in each step described above can be performed by each of the apparatuses described above or by an arbitrary apparatus other than each of the apparatuses described above. In that case, it is only necessary for the apparatus that performs that process to have the functions described above required to perform the process (e.g., functional blocks). Also, it is only necessary to transport information required for the process to the apparatus as appropriate.

<Others>

It should be noted that embodiments of the present technology are not limited to that described above and can be modified in various ways without departing from the gist of the present technology.

For example, in the present specification, a system refers to a set of a plurality of components (e.g., apparatuses, modules (parts)), and it does not matter whether or not all the components are accommodated in the same housing. Therefore, a plurality of apparatuses accommodated in different housings and connected via a network and a plurality of modules accommodated in a single housing are both systems.

Also, for example, a configuration described as a single apparatus (or processing section) may be divided and configured as a plurality of apparatuses (or processing sections). Conversely, a configuration described above as a plurality of apparatuses (or processing sections) may be combined and configured as a single apparatus (or processing section). Also, a configuration other than those described above may be naturally added to the configuration of each apparatus (or each processing section). Further, as long as the configuration or operation of the system as a whole is substantially the same, part of the configuration of a certain apparatus (or processing section) may be included in the configuration of other apparatus (or processing section).

Also, the present technology can have a cloud computing configuration in which a function is processed by a plurality of apparatuses via a network in a shared and cooperative manner.

Also, for example, each of the steps described in the above flowcharts can be performed not only by a single apparatus but also by a plurality of apparatuses in a shared manner. Further, if one step includes a plurality of processes, the plurality of processes included in that step can be performed not only by a single apparatus but also by a plurality of apparatuses in a shared manner.

Also, the present technology not only is carried out as an apparatus or a system but also can be carried out as any configuration mounted to an apparatus or an apparatus included in a system such as a processor as a system LSI (Large Scale Integration) and so on, a module using a plurality of processors and so on, a unit using a plurality of modules and so on, a set acquired by further adding other function to a unit (i.e., partial configuration of an apparatus) and so on.

It should be noted that the plurality of present technologies described in the present specification can be carried out independently of each other and alone unless inconsistency arises. Of course, the plurality of arbitrary present technologies can be carried out together. For example, the present technology described in any one of the embodiments can be carried out in combination with the present technology described in other embodiment. Also, the above arbitrary present technology can be carried out together with other technology not described above.

It should be noted that the present technology can have the following configurations:

(1)

An image processing apparatus including:

a projection control section adapted to superimpose a pattern image including a given pattern on any one of a plurality of subframe images corresponding to a frame and sequentially project each subframe image onto a projection section;

a capture control section adapted to cause a capture section to capture the projected subframe image on which the pattern image has been superimposed in synchronism with the projection control performed by the projection control section; and a corresponding point detection section adapted to detect corresponding points between the projected and captured images on the basis of the pattern image included in a captured image acquired as a result of capture by the capture section under control of the capture control section.

(2)

The image processing apparatus of feature (1), in which each of the plurality of subframe images corresponding to the frame is an image having a given color component of the frame image, and sequential projection of the plurality of subframe images is rendered equivalent to projection of the frame image.

(3)

The image processing apparatus of feature (1) or (2), in which the projection control section superimposes the pattern image on a subframe image having a highly luminous color component.

(4)

The image processing apparatus of any one of features (1) to (3), in which the projection control section superimposes the pattern image on a green component subframe image.

(5)

The image processing apparatus of any one of features (1) to (4), in which the plurality of subframes are eight subframes that include two red component subframes, two blue component subframes, and four green component subframes.

(6)

The image processing apparatus of any one of features (1) to (5), in which the projection control section superimposes a pair of pattern images whose directions of luminance change in the pattern are opposite on different subframe images of the plurality of subframes and causes the subframe images to be projected, and the capture control section causes projected subframe images, on which each of the pair of pattern images has been superimposed, to be captured.

(7)

The image processing apparatus of any one of features (1) to (6), in which each of the plurality of subframe images corresponding to the frame is an image having a given color component of the frame, and sequential projection of the plurality of subframe images is rendered equivalent to projection of the frame image, and the projection control section is configured to superimpose the pair of pattern images on different subframe images having the same color component of the plurality of subframes and causes the subframe images to be projected.

(8)

The image processing apparatus of any one of features (1) to (7), in which the projection control section transforms the frame into the plurality of subframes, superimposes the pair of pattern images on the different subframe images having the same color component of the plurality of acquired subframes, and causes the subframe images to be projected.

(9)

The image processing apparatus of any one of features (1) to (8), in which the projection control section transforms the frame into the plurality of subframes arranged in such a projection order that the subframe images projected immediately before the subframes on which the pair of pattern images are superimposed have the same color component.

(10)

The image processing apparatus of any one of features (1) to (9), in which the projection control section transforms the frame into the plurality of subframes arranged in a projection order different from the projection order of subframes corresponding to the frame on which no pattern image is superimposed.

(11)

The image processing apparatus of any one of features (1) to (10), in which the projection control section performs geometric corrections on each subframe image using parameters specified on the basis of corresponding points detected by the corresponding point detection section and causes the geometrically corrected images to be sequentially projected onto the projection section.

(12)

The image processing apparatus of any one of features (1) to (11), in which the capture control section extracts the pattern image included in a captured image of the projected subframe image acquired as a result of capture by the capture section.

(13)

The image processing apparatus of any one of features (1) to (12), in which the capture control section generates a differential image between the captured images, each including one of a pair of pattern images whose directions of luminance change in the pattern are opposite, and extracts the pattern image included in the differential image.

(14)

The image processing apparatus of any one of features (1) to (13), in which the capture control section binarizes the differential image and extracts the pattern image included in the acquired binarized image.

(15)

The image processing apparatus of any one of features (1) to (14), in which the projection control section projects subframe images, on which the pattern image has been superimposed, onto a plurality of projection sections, the capture control section causes a plurality of capture sections to capture projected subframe images, projected by the respective projection sections, on which the pattern image has been superimposed, and the corresponding point detection section finds corresponding points between projected images projected by the respective projection sections and the captured images captured by the respective capture sections.

(16)

The image processing apparatus of any one of features (1) to (15), further including:

an attitude estimation section adapted to estimate an attitude using the corresponding points detected by the corresponding point detection section.

(17)

The image processing apparatus of any one of features (1) to (16), further including:

a setup section adapted to perform setups regarding geometric corrections of projected images on the basis of the attitude estimated by the attitude estimation section.

(18)

The image processing apparatus of any one of features (1) to (17), further including:

a projection section adapted to project a projected image.

(19)

The image processing apparatus of any one of features (1) to (18), further including:

a capture section adapted to capture a projected image and acquire a captured image.

(20)

An image processing method including:

superimposing a pattern image including a given pattern on any one of a plurality of subframes corresponding to a frame and sequentially projecting each subframe onto a projection section;

causing a capture section to capture the projected subframe image, projected by the respective projection sections, on which the pattern image has been superimposed in synchronism with the projection control; and detecting, on the basis of the pattern image included in a captured image acquired as a result of capture by the capture section, corresponding points between the projected and captured images in accordance with the capture control.

REFERENCE SIGNS LIST

100 Projection/capture system, 101 Control apparatus, 102 Projection/capture apparatus, 111 Projection section, 112 Capture section, 151 Projection processing section, 152 Pattern image projection/capture section, 153 Corresponding point detection section, 154 Attitude estimation section, 155 Setup section, 156 Projection control section, 157 Capture control section, 161 Control section, 162 Prior information storage section, 163 Pattern storage section, 170 Pattern image projection section, 171 Image analysis section, 172 Subframing section, 173 Pattern superimposition section, 174 Projection processing section, 180 Pattern image capture section, 181 Capture processing section, 182 Differential image generation section, 183 Binarization section, 184 Pattern extraction section, 201 Control section, 400 Projection/capture system, 401 Network, 410 Projection/capture system, 411 Projection apparatus, 412 Capture apparatus, 420 Projection/capture system, 421 Projection/capture apparatus, 423 Control section, 430 Projection/capture apparatus

The invention claimed is:

1. An image processing apparatus comprising:

a projection control section configured to superimpose a pattern image including a given pattern on any one subframe image of a plurality of subframe images corresponding to a frame image and control a projection section to sequentially project each subframe image;

a capture control section configured to cause a capture section to capture the projected subframe image on which the pattern image has been superimposed in synchronism with the projection control performed by the projection control section; and a corresponding point detection section configured to detect corresponding points between the projected images and the captured images on a basis of the pattern image included in a captured image acquired as a result of the capture by the capture section under control of the capture control section, wherein the projection control section superimposes the pattern image on different subframe images of the plurality of subframe images having a same color component, and wherein the projection control section, the capture control section, and the corresponding point detection section are each implemented via at least one processor.

2. The image processing apparatus of claim 1, wherein each subframe image of the plurality of subframe images corresponding to the frame image is an image having a given color component of the frame image, and sequential projection of the plurality of subframe images is rendered equivalent to projection of the frame image.

3. The image processing apparatus of claim 2, wherein the same color component is a highly luminous color component.

4. The image processing apparatus of claim 3, wherein the same color component is a green component subframe image.

5. The image processing apparatus of claim 4, wherein the plurality of subframe images are eight subframe images that include two red component subframe images, two blue component subframe images, and four green component subframe images.

6. The image processing apparatus of claim 5, wherein the different subframe images are the four green component subframes.

7. The image processing apparatus of claim 1, wherein the projection control section superimposes the pattern image including a pair of pattern images whose directions of luminance change in the pattern are opposite on the different subframe images of the plurality of subframe images and causes the plurality of subframe images to be projected, and the capture control section causes projected subframe images, on which each of the pair of pattern images has been superimposed, to be captured.

8. The image processing apparatus of claim 7, wherein each subframe image of the plurality of subframe images corresponding to the frame image is an image having a given color component of the frame image, and sequential projection of the plurality of subframe images is rendered equivalent to projection of the frame image, and the projection control section is further configured to superimpose the pair of pattern images on the different subframe images having the same color component of the plurality of subframe images and causes the plurality of subframe images to be projected.

9. The image processing apparatus of claim 8, wherein the projection control section transforms the frame image into the plurality of subframe images, superimposes the pair of pattern images on the different subframe images having the same color component of the plurality of subframe images, and causes the plurality of subframe images to be projected.

10. The image processing apparatus of claim 9, wherein the projection control section transforms the frame image into the plurality of subframe images arranged in such a projection order that subframe images of the plurality of subframe images projected immediately before the subframe images of the plurality of subframe images on which the pair of pattern images are superimposed have the same color component.

11. The image processing apparatus of claim 9, wherein the projection control section transforms the frame image into the plurality of subframe images arranged in a projection order different from a projection order of subframes corresponding to the frame image on which no pattern image is superimposed.

12. The image processing apparatus of claim 1, wherein the projection control section performs geometric corrections on each subframe image of the plurality of subframe images using parameters specified on a basis of corresponding points detected by the corresponding point detection section and causes the projection section to sequentially project the geometrically corrected subframe images.

13. The image processing apparatus of claim 1, wherein the capture control section extracts the pattern image included in a captured image of the projected subframe image acquired as a result of capture by the capture section.

14. The image processing apparatus of claim 13, wherein the capture control section generates a differential image between the captured images, each of the captured images including one of a pair of pattern images whose directions of luminance change in the pattern are opposite, and extracts the pattern image included in the differential image.

15. The image processing apparatus of claim 14, wherein the capture control section binarizes the differential image and extracts the pattern image included in the binarized differential image.

16. The image processing apparatus of claim 1, wherein the projection control section controls a plurality of projection sections to project subframe images, on which the pattern image has been superimposed, the capture control section causes a plurality of capture sections to capture projected subframe images, projected by the respective projection sections, on which the pattern image has been superimposed, and the corresponding point detection section finds corresponding points between projected images projected by the respective projection sections and the captured images captured by the respective capture sections.

17. The image processing apparatus of claim 1, further comprising:

an attitude estimation section configured to estimate an attitude using the corresponding points detected by the corresponding point detection section, wherein the attitude estimation section is implemented via at least one processor.

18. The image processing apparatus of claim 17, further comprising:

a setup section configured to perform setups regarding geometric corrections of projected images on a basis of the attitude estimated by the attitude estimation section, wherein the setup section is implemented via at least one processor.

19. The image processing apparatus of claim 1, further comprising:

the projection section configured to project a projected image.

20. The image processing apparatus of claim 1, further comprising:

the capture section configured to capture a projected image and acquire a captured image.

21. An image processing method comprising:

superimposing a pattern image including a given pattern on any one subframe image of a plurality of subframe images corresponding to a frame image and control a projection section to sequentially project each subframe image;

causing a capture section to capture the projected subframe image, projected by the respective projection sections, on which the pattern image has been superimposed in synchronism with the projection control; and detecting, on a basis of the pattern image included in a captured image acquired as a result of capture by the capture section, corresponding points between the projected images and the captured images in accordance with the pattern image included in the captured image acquired as a result of the capture by the capture section, wherein the superimposing of the pattern image includes superimposing the pattern image on different subframe images of the plurality of subframe images having a same color component.

22. A non-transitory computer-readable medium having embodied thereon a program, which when executed by a computer causes the computer to execute a method, the method comprising:

superimposing a pattern image including a given pattern on any one subframe image of a plurality of subframe images corresponding to a frame image and control a projection section to sequentially project each subframe image;

causing a capture section to capture the projected subframe image, projected by the respective projection sections, on which the pattern image has been superimposed in synchronism with the projection control; and detecting, on a basis of the pattern image included in a captured image acquired as a result of capture by the capture section, corresponding points between the projected images and the captured images in accordance with the pattern image included in the captured image acquired as a result of the capture by the capture section, wherein the superimposing of the pattern image includes superimposing the pattern image on different subframe images of the plurality of subframe images having a same color component.

* * * * *